United States Patent
Yamakawa et al.

(10) Patent No.: US 7,012,866 B2
(45) Date of Patent: Mar. 14, 2006

(54) ROTATION CONTROL METHOD FOR CAV SYSTEM BASED ON SEQUENTIAL OR RANDOM ACCESS REQUEST AND ON ZONE ACCESS BASED ON ACCESS REQUEST OF RECORDING MEDIUM

(75) Inventors: Teruji Yamakawa, Yokohama (JP); Akira Ban, Yokohama (JP); Yutaka Horiguchi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 208 days.

(21) Appl. No.: 09/813,244

(22) Filed: Mar. 20, 2001

(65) Prior Publication Data
US 2002/0039334 A1    Apr. 4, 2002

(30) Foreign Application Priority Data
Sep. 29, 2000    (JP)    ............................. 2000-301464

(51) Int. Cl.
G11B 7/00    (2006.01)
(52) U.S. Cl. .................. 369/47.33; 369/53.3; 369/47.4
(58) Field of Classification Search ............... 369/53.3, 369/47.4, 47.33
See application file for complete search history.

(56) References Cited

U.S. PATENT DOCUMENTS

| | | | | |
|---|---|---|---|---|
| 5,083,269 A | * | 1/1992 | Syobatake et al. .......... 711/100 |
| 5,606,543 A | * | 2/1997 | Sugiyama ............... 369/124.09 |
| 5,646,921 A | | 7/1997 | Yokota et al. ................. 369/50 |
| 5,729,513 A | * | 3/1998 | Akahira et al. .......... 369/53.29 |
| 5,982,726 A | | 11/1999 | Ro et al. ....................... 369/53 |
| 5,986,988 A | | 11/1999 | Kusano et al. ................ 369/50 |
| 6,028,539 A | * | 2/2000 | Matsui ........................ 341/55 |
| 6,212,582 B1 | * | 4/2001 | Chong et al. ................. 710/57 |

FOREIGN PATENT DOCUMENTS

| | | |
|---|---|---|
| EP | 418 858 | 3/1991 |
| EP | 00526185 A2 * | 7/1992 |
| JP | 3-161826 | 7/1991 |
| JP | 5-041046 | 2/1993 |
| JP | 5-262686 | 10/1993 |
| JP | 7-016042 | 1/1995 |
| JP | 8-115569 | 5/1996 |
| JP | 10-092101 | 4/1998 |
| JP | 11-306661 | 11/1999 |

\* cited by examiner

Primary Examiner—Gautam R. Patel
(74) Attorney, Agent, or Firm—Greer, Burns & Crain, Ltd.

(57) ABSTRACT

A rotation control method controls rotation of a CAV system recording medium which has a plurality of zones divided in a radial direction thereof. The rotation control method detects a state within a memory which temporarily stores write data to be written on the recording medium and/or read data read from the recording medium, and switches and controls a rotational speed of the recording medium based on the detected state of the memory, depending on an area which is accessed of a plurality of areas of the recording medium dividing the recording medium in the radial direction thereof.

10 Claims, 39 Drawing Sheets

FIG.3

| ZONE | | ZCAV 3637rpm | 4138rpm | (Kbyte/s) 5001rpm |
|---|---|---|---|---|
| OUTER PERIPHERY | 0 | 5090 | | |
| | 1 | 4966 | | |
| | 2 | 4842 | | |
| | 3 | 4717 | | |
| | 4 | 4593 | | |
| | 5 | 4469 | 5085 | |
| | 6 | 4345 | 4944 | |
| | 7 | 4221 | 4802 | |
| | 8 | 4097 | 4661 | |
| | 9 | 3973 | 4520 | |
| | 10 | 3848 | 4379 | |
| | 11 | 3724 | 4237 | 5121 |
| | 12 | 3600 | 4096 | 4950 |
| | 13 | 3476 | 3955 | 4780 |
| | 14 | 3352 | 3814 | 4609 |
| | 15 | 3228 | 3672 | 4438 |
| | 16 | 3104 | 3531 | 4268 |
| INNER PERIPHERY | 17 | 2979 | 3390 | 4097 |

FIG. 7

|  | 3637rpm | 4138rpm | 5001rpm |
|---|---|---|---|
| 0 | 80.34 | – | – |
| 1 | 78.38 | – | – |
| 2 | 76.42 | – | – |
| 3 | 74.46 | – | – |
| 4 | 72.5 | – | – |
| 5 | 70.55 | 80.28 | – |
| 6 | 68.59 | 78.05 | – |
| 7 | 66.63 | 75.82 | – |
| 8 | 64.67 | 73.59 | – |
| 9 | 62.71 | 71.36 | – |
| 10 | 60.75 | 69.13 | – |
| 11 | 58.79 | 66.9 | 80.83 |
| 12 | 56.83 | 64.67 | 78.11 |
| 13 | 54.87 | 62.44 | 75.44 |
| 14 | 52.91 | 60.21 | 72.75 |
| 15 | 50.95 | 57.98 | 70.06 |
| 16 | 48.99 | 55.75 | 67.36 |
| 17 | 47.03 | 53.52 | 64.67 |

FIG.11

| ZONE | | ZCAV 3637rpm | 4138rpm | (Kbyte/s) 5001rpm |
|---|---|---|---|---|
| OUTER PERIPHERY | 0 | 5090 | | |
| | 1 | 4966 | | |
| | 2 | 4842 | | |
| | 3 | 4717 | | |
| | 4 | 4593 | | |
| | 5 | 4469 | 5085 | |
| | 6 | 4345 | 4944 | |
| | 7 | 4221 | 4802 | |
| | 8 | 4097 | 4661 | |
| | 9 | 3973 | 4520 | |
| | 10 | 3848 | 4379 | |
| | 11 | 3724 | 4237 | 5121 |
| | 12 | 3600 | 4096 | 4950 |
| | 13 | 3476 | 3955 | 4780 |
| | 14 | 3352 | 3814 | 4609 |
| | 15 | 3228 | 3672 | 4438 |
| | 16 | 3104 | 3531 | 4268 |
| INNER PERIPHERY | 17 | 2979 | 3390 | 4097 |

FIG.12

| ZONE NUMBER | STARTING LBA | LAST LBA | ROTATIONAL SPEED |
|---|---|---|---|
| 0 | 0 | FFF | a |
| 1 | 1000 | 1FFF | a+b |
| 2 | 2000 | 2FFF | a+b+c |
| 3 | 3000 | 3FFF | a+b+c+d |
| 4 | 4000 | 4FFF | a+b+c+d+e |
| 5 | 5000 | 5FFF | a+b+c+d+e+f |
| n | n × 1000 | (n × 1000)+FFF | a+H |

(Hex)     [a<a+b<a+b+c<a+b+c+d<a+b+c+d+e<a+b+c+d+e+f<a+H]

| # | FIRST LBA | BCNO. | ADR OF FIRST LBA |
|---|-----------|-------|------------------|
| 1 | 1000 | 10 | 0 |
| 2 | 1020 | 40 | 4000 |
| 3 | 1070 | 20 | E000 |
| 4 | 10B0 | 70 | 16000 |
| . | ... | . | ... |
| n | ... | . | ... |

(UNIT: Hex)

| # | FIRST LBA | BCNO. | ADR OF FIRST LBA |
|---|-----------|-------|------------------|
| 1 | 1000 | 10 | 0 |
| 2 | 1020 | 40 | 4000 |
| 3 | 1070 | 20 | E000 |
| 4 | 10B0 | ~~70~~ | 16000 |
| . | ... | . | ... |
| n | ... | . | ... |

(UNIT:Hex)

| # | FIRST LBA | BCNO. | ADR OF FIRST LBA |
|---|---|---|---|
| 1 | 1000 | 10 | 0 |
| 2 | 1020 | 40 | 4000 |
| 3 | 1070 | 20 | E000 |
| 4 | 10B0 | 70 | 16000 |
| . | ... | . | ... |
| n | ... | . | ... |

(UNIT:Hex)

ROTATION CONTROL METHOD FOR CAV SYSTEM BASED ON SEQUENTIAL OR RANDOM ACCESS REQUEST AND ON ZONE ACCESS BASED ON ACCESS REQUEST OF RECORDING MEDIUM

BACKGROUND OF THE INVENTION

This application claims the benefit of a Japanese Patent Application No. 2000-301464 filed Sep. 29, 2000, in the Japanese Patent Office, the disclosure of which is hereby incorporated by reference.

1. Field of the Invention

The present invention generally relates to rotation control methods and storage apparatuses, and more particularly to a rotation control method for controlling rotation of a recording medium such as an optical disk when recording information on and/or reproducing information from the recording medium, and to a storage apparatus which employs such a rotation control method.

Recording media such as optical disks employ a zone constant angular velocity (ZCAV) system or a zone constant linear velocity (ZCLV) system. When the ZCAV system is employed, it is possible to obtain a high random access performance with respect to the recording medium, but a recording and/or reproducing clock frequency becomes low. For example, a data transfer rate at an inner periphery of the optical disk becomes slow. On the other hand, when the ZCLV system is employed, it is possible to obtain a high data transfer rate, but the random access performance with respect to the recording medium becomes poor because the rotational speed of the recording medium such as the optical disk changes upon access thereto.

2. Description of the Related Art

Recently, due to the popular use of the Internet, there are increased opportunities for users to download data, such as music and video data, via a communication line or the like, and to record the downloaded data in recording media. In such cases, magnetic disks of a hard disk drive (HDD), and removable optical disks such as a digital versatile disk random access memory (DVD-RAM) are used as the recording media.

In the case of the video data, the size of one file is relatively large. In addition, the video data is a continuous data, and it is necessary to continuously and stably maintain the data transfer rate over a predetermined value during recording to or reproduction from the optical disk, in order not to generate an image distortion such as frame dropout.

On the other hand, in personal computers or the like, a disk management area is usually provided in a portion of the optical disk for the purposes of managing programs and files. Accordingly, it becomes necessary to access the disk management area every time an access is made to the program or file. For this reason, in a case where the size of each file is relatively small, the access to the file and the access to the disk management area are repeated, to thereby generate a random access to the optical disk.

Therefore, the required data transfer rate and the required random access performance differ depending on the state of use of the recording medium, such as the kind of data processed, the file size and the usage of the recording medium.

As a result, there was a problem in that it is conventionally impossible to appropriately set the data transfer rate and the random access performance depending on the state of use of the recording medium, such as the kind of data processed, the file size and the usage of the recording medium.

SUMMARY OF THE INVENTION

Accordingly, it is a general object of the present invention to provide a novel and useful rotation control method and storage apparatus, in which the problems described above are eliminated.

Another and more specific object of the present invention is to provide a rotation control method and a storage apparatus, which can set an optimum data transfer rate and an optimum random access performance depending on the state of use of the recording medium.

Still another object of the present invention is to provide a rotation control method for controlling rotation of a CAV system recording medium which has a plurality of zones divided in a radial direction thereof, comprising a detecting step which detects a state within a memory which temporarily stores write data to be written on the recording medium and/or read data read from the recording medium, and a controlling step which switches and controls a rotational speed of the recording medium based on the state detected by the detecting step, depending on an area which is accessed of a plurality of areas of the recording medium dividing the recording medium in the radial direction thereof. According to the rotation control method of the present invention, it is possible to set an optimum data transfer rate and an optimum random access performance depending on the state of use of the recording medium. In addition, by detecting the state of use of the memory, a rotational speed switching (changing) time becomes inconspicuous when viewed from a host unit, thereby making it possible to secure a desired data transfer rate without deteriorating the data transfer rate with respect to the host unit.

A further object of the present invention is to provide a storage apparatus for recording and/or reproducing information with respect to a CAV system recording medium which has a plurality of zones divided in a radial direction thereof, comprising a memory which temporarily stores write data to be written on the recording medium and/or read data read from the recording medium, a detector detecting a state within the memory, and a controller switching and controlling a rotational speed of the recording medium based on the state detected by the detector, depending on an area which is accessed of a plurality of areas of the recording medium dividing the recording medium in the radial direction thereof. According to the storage apparatus of the present invention, it is possible to set an optimum data transfer rate and an optimum random access performance depending on the state of use of the recording medium. In addition, by detecting the state of use of the memory, a rotational speed switching (changing) time becomes inconspicuous when viewed from a host unit, thereby making it possible to secure a desired data transfer rate without deteriorating the data transfer rate with respect to the host unit.

Other objects and further features of the present invention will be apparent from the following detailed description when read in conjunction with the accompanying drawings.

BRIEF DESCRIPTION OF THE DRAWINGS

FIG. 3 is a diagram showing the relationships of a zone on an optical disk, a data transfer rate and a rotational speed of the optical disk;

FIG. 7 is a diagram showing the relationships of the zone on the optical disk, a recording or reproducing clock frequency and the rotational speed of the optical disk;

FIG. 11 is a diagram for explaining a buffer region provided on the optical disk;

FIG. 12 is a diagram showing a relationship of a physical block address and a rotational speed for each zone;

DESCRIPTION OF THE PREFERRED EMBODIMENTS

Figure 1:
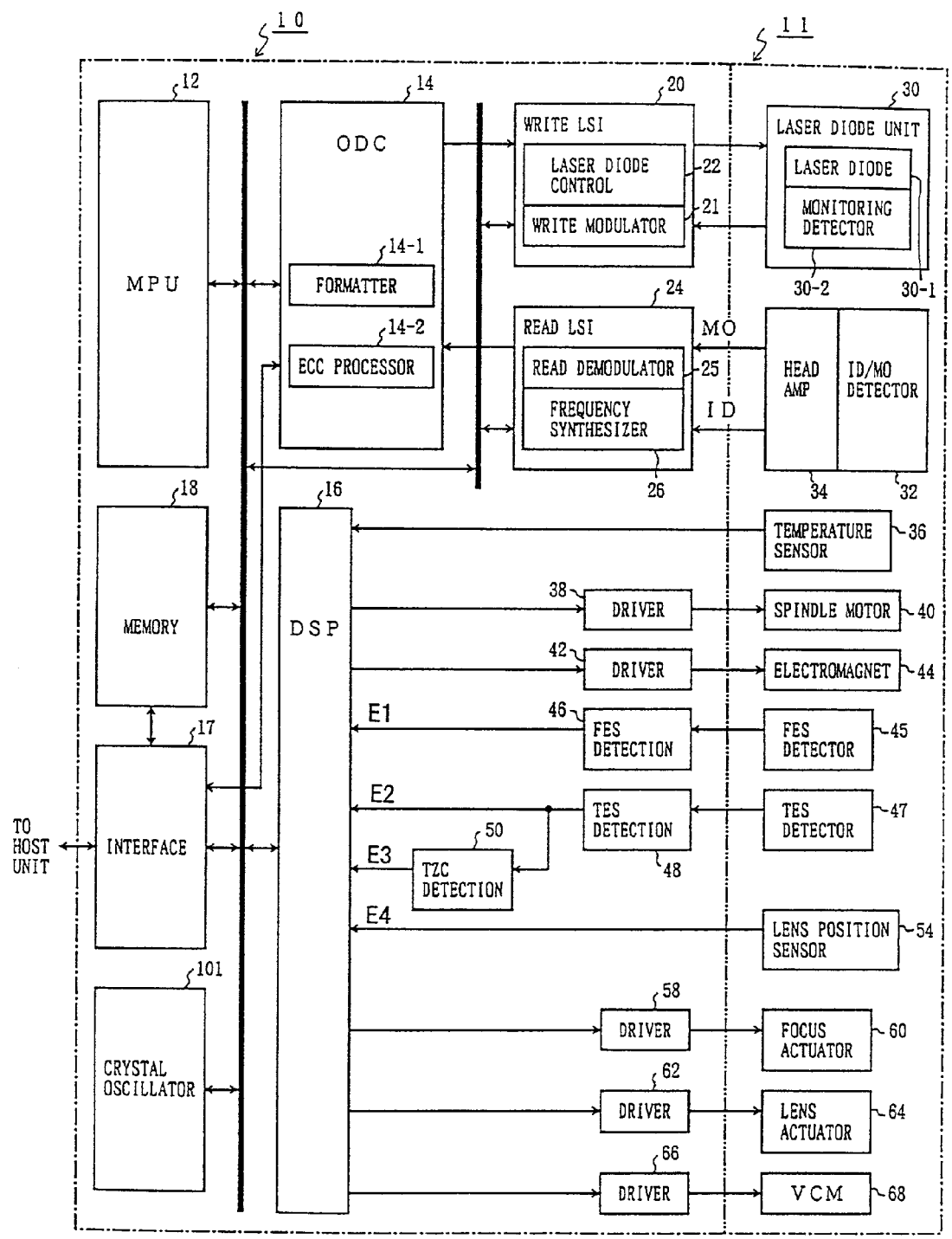
FIG. 1 is a system block diagram showing the construction of a first embodiment of a storage apparatus according to the present invention.

A description will be given of embodiments of a rotation control method according to the present invention and a storage apparatus according to the present invention, by referring to the drawings.

First, a description will be given of a first embodiment of the storage apparatus according to the present invention, by referring to FIGS. 1 and 2. FIG. 1 is a system block diagram showing the construction of this first embodiment of the storage apparatus. In this first embodiment of the storage apparatus, the present invention is applied to an optical disk unit. In addition, this first embodiment of the storage apparatus employs a first embodiment of the rotation control method according to the present invention.

As shown in FIG. 1, the optical disk unit generally includes a control unit 10 and an enclosure 11. The control unit 10 includes a microprocessor unit (MPU) 12 which generally controls the operation of the optical disk unit, an interface 17 which exchanges commands and data between a host unit (not shown), an optical disk controller (ODC) 14 which carries out processes required to read and write data with respect to an optical disk (not shown), a digital signal processor (DSP) 16, and a memory 18. The memory 18 is used in common by the MPU 12, the ODC 14 and the interface 14, and for example, includes a dynamic random access memory (DRAM), a nonvolatile memory which stores control programs and flag information, or the like. A crystal oscillator 101 is coupled to the MPU 12.

The ODC 14 includes a formatter 14-1 and an error correction code (ECC) processor 14-2. At the time of a write access, the formatter 14-1 divides NRZ write data into sector units of the optical disk and generates a recording format, and the ECC processor 14-2 generates and adds an ECC with respect to sector write data units and also generates and adds if necessary a cyclic redundancy check (CRC) code. Further, the ECC processor 14-2 converts the sector data with the encoded ECC into a 1–7 run length limited (RLL) code, for example.

At the time of a read access, a reverse conversion of the 1–7 RLL is carried out with respect to the sector data, and after carrying out the CRC, the error detection and error correction using the ECC are carried out in the ECC processor 14-2. Further, the NRZ data in sector units are connected in the formatter 14-1 so as to transfer a NRZ read data stream to the host unit.

A write large scale integrated (LSI) circuit 20 is provided with respect to the ODC 14. This write LSI circuit 20 includes a write modulator 21 and a laser diode control circuit 22. A control output of the laser diode control circuit 22 is supplied to a laser diode unit 30 which is provided in an optical unit of the enclosure 11. The laser diode unit 30 integrally includes a laser diode 30-1 and a monitoring detector 30-2. The write modulator 21 converts the write data into the data format of the pit position modulation (PPM) recording (or mark recording) or, a pulse width modulation (PWM) recording (or edge recording).

When recording and reproducing data with respect to the optical disk using the laser diode unit 30, this embodiment uses a writable magneto-optical (MO) cartridge medium employing the PWM recording which records the data in correspondence with the existence of mark edges on the optical disk. In addition, the recording format used by the optical disk is a 1.3 GB format using magnetic super resolution (MSR) and the ZCAV system. When the optical disk is loaded into the optical disk unit, an identification (ID) portion of the optical disk is first read, so as to recognize the type (storage capacity and the like) of the optical disk in the MPU 12 based on pit intervals of the ID portion. The MPU 12 notifies the recognition result indicating the type of optical disk to the ODC 14.

A read LSI circuit 24 is provided as a read system with respect to the ODC 14. A read demodulator 25 and a frequency synthesizer 26 are provided in the read LSI circuit 24. An ID/MO detector 32 of the enclosure 11 detects a laser beam emitted from the laser diode 30-1 and returned via the optical disk, and a detection signal from this ID/MO detector 32 is input as an ID signal and a MO signal to the read LSI circuit 24 via a head amplifier 34.

The read demodulator 25 of the read LSI circuit 24 includes the functions of circuits such as an automatic gain control (AGC) circuit, a filter and a sector mark detection circuit. Hence, the read demodulator 25 generates a read clock and read data from the input ID signal and MO signal, and demodulates the PWM data back into the original NRZ data. In addition, since the ZCAV system is employed, the MPU 12 controls a setting of a frequency dividing ratio with respect to the frequency synthesizer 26 of the read LSI circuit 24 in order to generate a clock frequency in correspondence with the zone.

The frequency synthesizer 26 is a phase locked loop (PLL) circuit having a programmable frequency divider, and generates as a read clock a reproducing reference clock having a predetermined specific frequency depending on the zone position on the optical disk. In other words, the frequency synthesizer 26 is formed by the PLL circuit having the programmable frequency divider, and in a normal mode, generates the recording and/or reproducing reference clock having a frequency fo based on $fo=(m/n)fi$ according to a frequency dividing ratio m/n which is set by the MPU 12 depending on a zone number.

A denominator n of the frequency dividing ratio m/n is a specific value depending on the type of optical disk. In addition, a numerator m of the frequency dividing ratio m/n is a value which changes depending on the zone position on the optical disk, and table information of the values corresponding to the zone numbers are prepared in advance with respect to each type of optical disk. Moreover, fi denotes a recording and/or reproducing reference clock frequency generated outside the frequency synthesizer 26.

The read data demodulated in the read LSI circuit 24 is supplied to the read system of the ODC 14, and after carrying out the reverse conversion of the 1–7 RLL, the CRC and the ECC processes are carried out by the encoding function of the ECC processor 14-2 so as to restore the original NRZ data. Next, the formatter 14-1 connects and converts the NRZ sector data into the NRZ data stream, and this NRZ read data stream is transferred to the host unit via the memory 18 and the interface 17.

A detection signal from a temperature sensor 36 provided in the enclosure 11 is supplied with respect to the MPU 12 via the DSP 16. Based on an environmental temperature within the optical disk unit detected by the temperature sensor 36, the MPU 12 controls the light emission powers for the read, write and erase in the laser diode control circuit 22.

The MPU 12 controls a spindle motor 40 provided in the enclosure 11 via the DSP 16 and a driver 38. In this embodiment, since the ZCAV system is employed as the recording format of the optical disk, the spindle motor 40 is rotated at a constant speed of 3637 rpm, for example.

In addition, the MPU 12 controls an electromagnet 44 provided in the enclosure 11 via the DSP 16 and a driver 42. The electromagnet 44 is arranged on a side opposite to the side of the optical disk on which the laser beam is irradiated within the optical disk unit which is loaded with this optical disk. This electromagnet 44 supplies an external magnetic field on the optical disk at the time of the recording and erasure. In the case of the optical disk having the 1.3 GB format employing the MSR, the electromagnet 44 also supplies the external magnetic field on the optical disk at the time of the MSR reproduction.

The DSP 16 is provided with a servo function for positioning the laser beam from the laser diode 30-1 with respect to the optical disk, and functions as a seek controller and an on-track controller which enable the laser beam to seek a target track and to be positioned on the target track. The seek control and the on-track control may be carried out simultaneously in parallel with the write access or the read access of the MPU 12 with respect to a host command.

In order to realize the servo function of the DSP 16, a focus error signal (FES) detector 45 is provided in the optical unit of the enclosure 11 so as to detect the laser beam emitted from the laser diode 30-1 and returned via the optical disk. A FES detection circuit 46 generates a FES E1 from a detection signal received from the FES detector 45, and inputs this FES E1 to the DSP 16.

A tracking error signal (TES) detector 47 is also provided in the optical unit of the enclosure 11 so as to detect the laser beam emitted from the laser diode 30-1 and returned via the optical disk. A TES detection circuit 48 generates a TES E2 from a detection signal received from the TES detector 47, and inputs this TES E2 to the DSP 16. The TES E2 is also input to a track zero crossing (TZC) detection circuit 50, and this TZC detection circuit 50 generates a TZC signal E3 which is input to the DSP 16.

A lens position sensor 54 is provided in the enclosure 11. This lens position sensor 54 detects a position of an object lens through which the laser beam is irradiated on the optical disk. A lens position detection signal (LPOS) E4 from the lens position sensor 54 is input to the DSP 16. The DSP 16 controls and drives a focus actuator 60, a lens actuator 64 and a voice coil motor (VCM) 68 via corresponding drivers 58, 62 and 66, so as to control the position of a beam spot formed by the laser beam on the optical disk.

Figure 2:
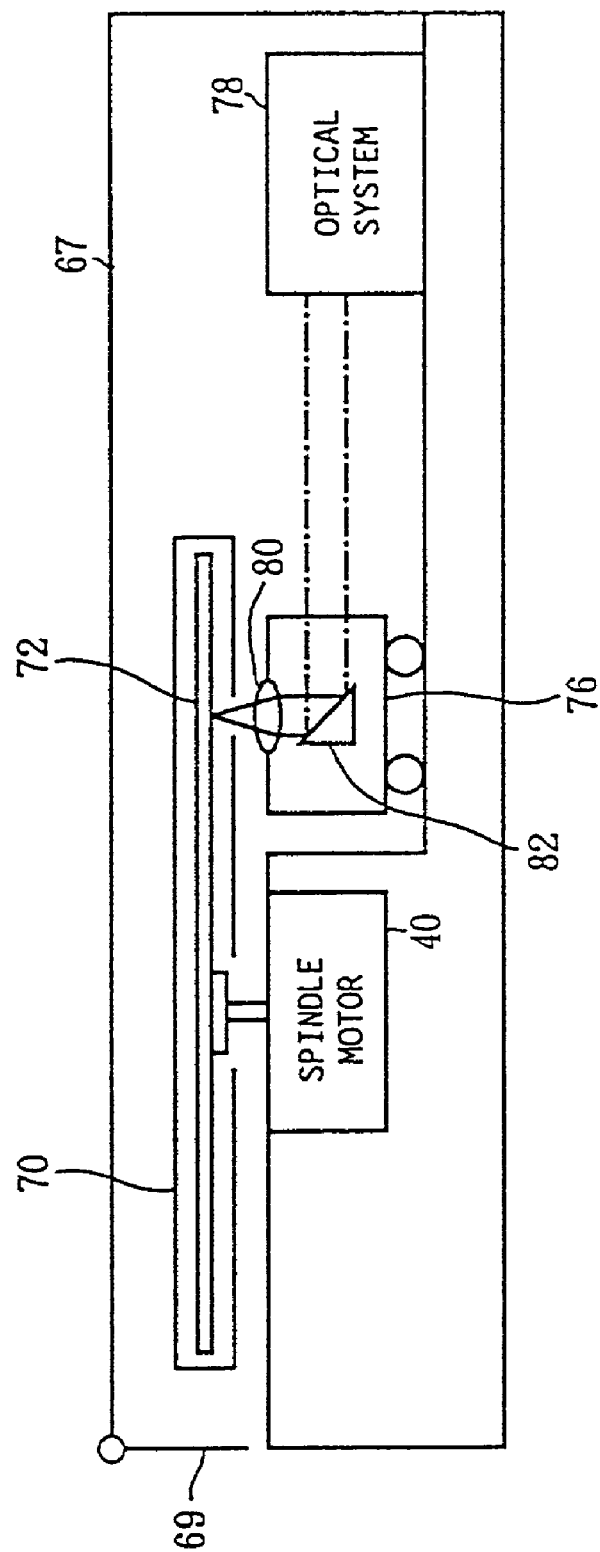
FIG. 2 is a cross sectional view showing the general construction of an enclosure.

FIG. 2 is a cross sectional view showing the general construction of the enclosure 11. As shown in FIG. 2, the spindle motor 40 is provided within a housing 67. By inserting a MO cartridge 70 into the housing 67 from the side of an inlet door 69, an optical disk (MO disk) 72 accommodated within the MO cartridge 70 engages a rotary shaft of the spindle motor 40, thereby loading the optical disk 72 with respect to the optical disk unit.

A carriage 76 is provided below the loaded optical disk 72 within the MO cartridge 70. This carriage 76 is freely movable in a direction which traverses tracks on the optical disk 72 when driven by the VCM 64. An objective lens 80 is mounted on the carriage 76. The laser beam emitted from the laser diode 30-1 which is provided within a fixed optical system 78 is reflected by a mirror 82, and is irradiated on the recording surface of the optical disk 72 via the objective lens 80, thereby forming a beam spot on the recording surface.

The movement of the objective lens 80 along an optical axis is controlled by the focus actuator 60 of the enclosure shown in FIG. 1. In addition, the objective lens 80 is movable in a radial direction which traverses the tracks on the optical disk 72 by the lens actuator 64, within a range of several tens of tracks. The position of the objective lens 80 mounted on the carriage 76 is detected by the lens position sensor 54 shown in FIG. 1. The lens position sensor 54 outputs the lens position detection signal E4 which takes a value zero at a neutral position where the optical axis of the objective lens 80 is perpendicular to the recording surface of the optical disk 72, and has a magnitude and a polarity depending on the amount the optical axis of the objective lens 80 moves towards the inner or outer peripheral side of the optical disk 72.

Since the ZCAV system is employed, the optical disk 72 is divided into a plurality of zones in the radial direction thereof. In the normal mode, the optical disk 72 is rotated at a constant rotational speed by the spindle motor 40, and the recording and/or reproducing reference clock has the same frequency within each of the zones. In addition, the frequency of the recording and/or reproducing clock is set higher for the outer peripheral side of the optical disk 72 than the inner peripheral side of the optical disk 72. In this embodiment, this optical disk 72 is divided into a number of areas less than or equal to the number of zones, from the outer peripheral side to the inner peripheral side of the optical disk 72. Furthermore, the spindle motor 40 is controlled so that the rotational speed of the optical disk 72 becomes higher towards the inner peripheral side for every area. In other words, in a high-speed mode, the rotational speed of the optical disk 72 is switched in each area by a number of times such that undesirable effects on the random access performance are suppressed, and the recording and/or reproducing clock and the recording and/or reproducing power in the laser diode control circuit 22 are switched accordingly. Hence, in the normal mode, a high random access performance is obtained because the optical disk 72 which employs the ZCAV system is used in conformance with the ZCAV system. On the other hand, in the high-speed mode, a high data transfer rate is obtained during the recording and/or reproduction with respect to the optical disk 72 because the optical disk 72 which employs the ZCAV system is used in conformance with a kind of ZCLV system.

In the normal mode, the rotational speed of the optical disk 72 is controlled to be constant. On the other hand, the rotational speed of the optical disk 72 is switched and controlled in a plurality of stages.

Figure 4:
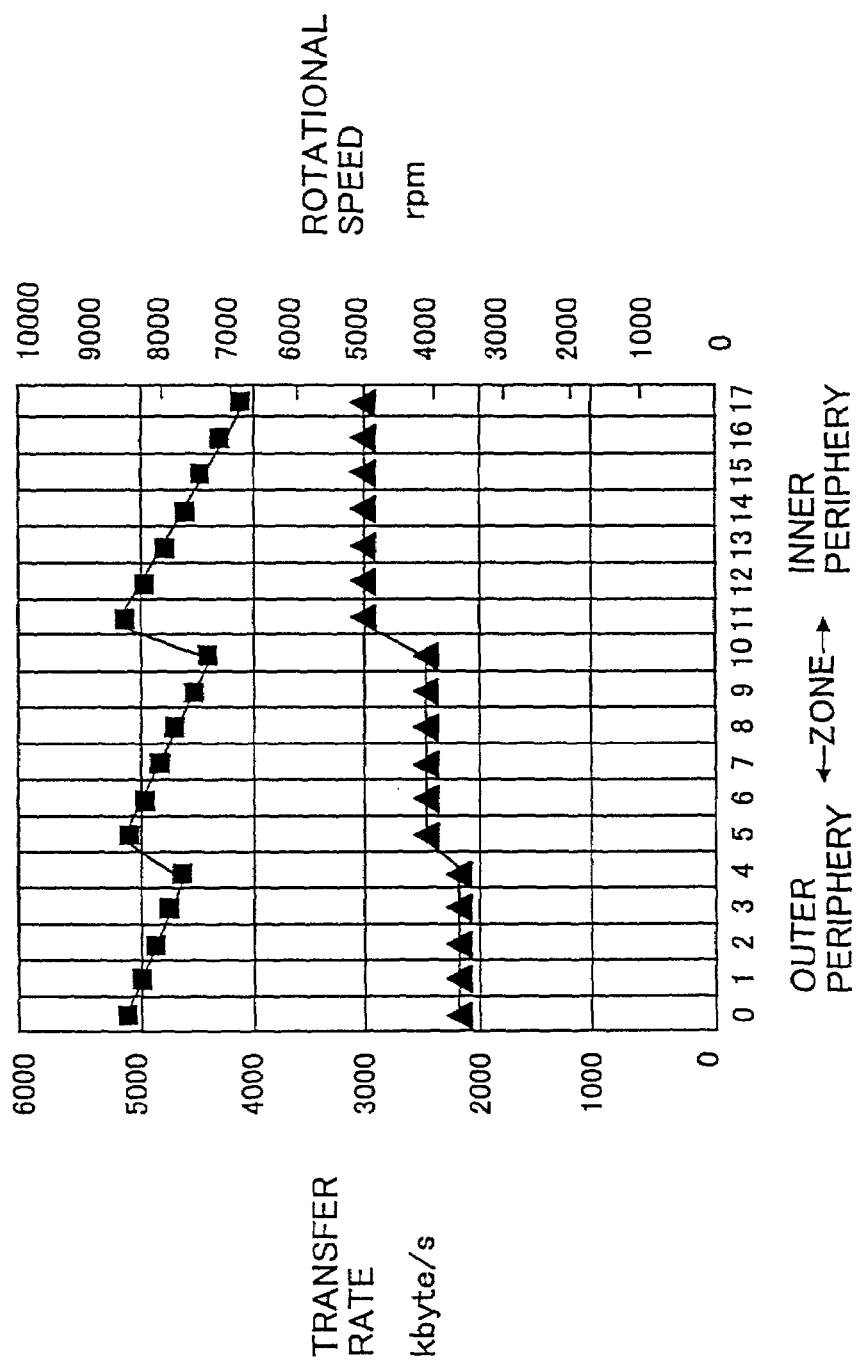
FIG. 4 is a diagram showing the relationships of the data transfer rate and the rotational speed of the optical disk with respect to the zone on the optical disk.

FIG. 3 is a diagram showing the relationships of the zone on the optical disk 72, the data transfer rate and the rotational speed of the optical disk 72. For the sake of convenience, FIG. 3 shows a case where one area is made up of zone units, but as described above, the relationship between the area and the zone is not limited to that shown in FIG. 3. In addition, FIG. 4 is a diagram showing the relationships of the data transfer rate and the rotational speed of the optical disk 72 with respect to the zone on the optical disk 72. In FIG. 4, a rectangular mark indicates the data transfer rate, and a triangular mark indicates the rotational speed of the optical disk 72. FIGS. 3 and 4 show the relationships for a case where the optical disk 72 has a storage capacity of 1.3 GB and the rotational speed of the optical disk 72 can be switched among three rotational speeds in the high-speed mode. Furthermore, it is assumed for the sake of convenience that a zone 0 is located on the outer peripheral side of the optical disk 72 and a zone 17 is located on the inner peripheral side of the optical disk 72.

In the high-speed mode, in the zone 17 located at the innermost peripheral side of the optical disk 72, for example, the rotational speed of the optical disk 72 is switched to 5001 rpm, and the data transfer rate is 4097 Kbyte/s. In the normal mode, the rotational speed is 3637 rpm and the data transfer rate is 2979 Kbyte/s in the zone 17, and it may be seen that the data transfer rate is improved in the high-speed mode. Accordingly, it is possible to obtain a desired data transfer rate on the order of approximately 3700 to 3800 Kbyte/s. In this embodiment, the upper limit of the data transfer rate is restricted to 5121 Kbyte/s or less due to a limit frequency of the circuit, and for this reason, it is not possible to operate at the rotational speed of 5001 rpm in the zones 0 through 10 located on the outer peripheral side of the zone 11. However, the rotational speeds and the data transfer rates which are switched are of course not limited to those shown in FIGS. 3 and 4, and the number of switchable rotational speeds is not limited to three.

In the case of a continuous data such as video and music data amounting to a large amount of data, the video or music stops during the recording and/or reproduction to generate an image distortion, frame dropout and the like, unless the data transfer rate is maintained over a reference value. The data transfer rate during the recording and/or reproduction of a digital video (DV) format is 3700 to 3800 Kbyte/s, and the image and sound becomes discontinuous if the data transfer rate is lower than this data transfer rate range. In the case shown in FIG. 3, the data transfer rate is lower than 3700 Kbyte/s on the inner peripheral side of the zones 12 through 17 when the rotational speed is 3637 rpm, and it may be seen that this data transfer rate is not suited for the recording and/or reproduction of the continuous data such as the video and music data amounting to the large amount of data. Hence, the rotational speed is switched to 5001 rpm, so that the data transfer rate of 3700 to 3800 Kbyte/s is guaranteed from the inner peripheral side to the outer peripheral side of the optical disk 72. Because of the limit frequency of the circuit, it is not possible to set the rotational speed to 5001 rpm or higher at all areas on the optical disk 72, and for this reason, an area where the rotational speed is set to 4138 rpm is also provided on the optical disk 72. In this manner, the rotational speed of the optical disk 72 is changed depending on the area, so that the data transfer rate becomes 3700 to 3800 Kbyte/s or greater at all areas from the inner peripheral side to the outer peripheral side of the optical disk 72.

Figure 5:
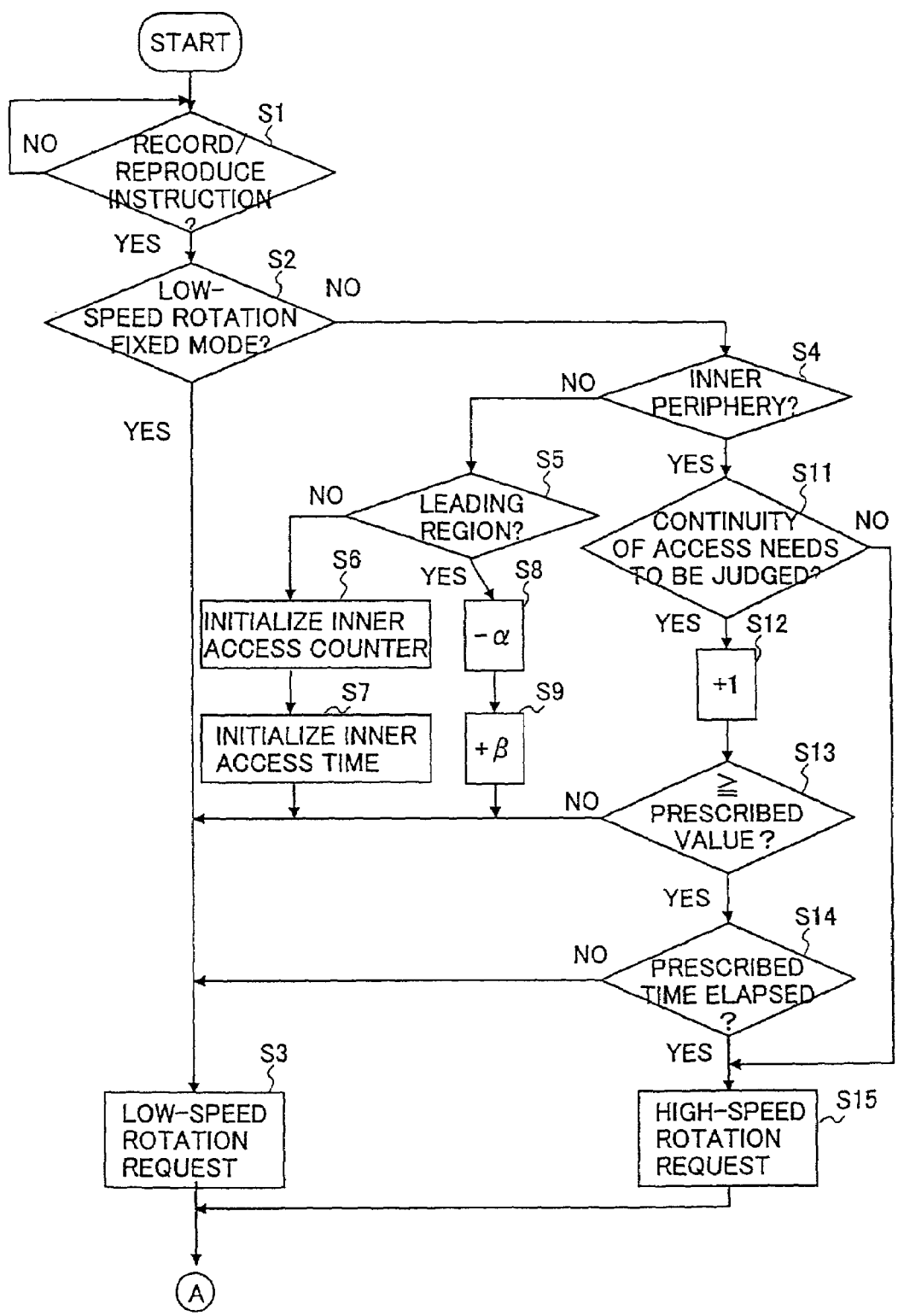
FIG. 5 is a flow chart for explaining the operation of a MPU of the first embodiment.
Figure 6:
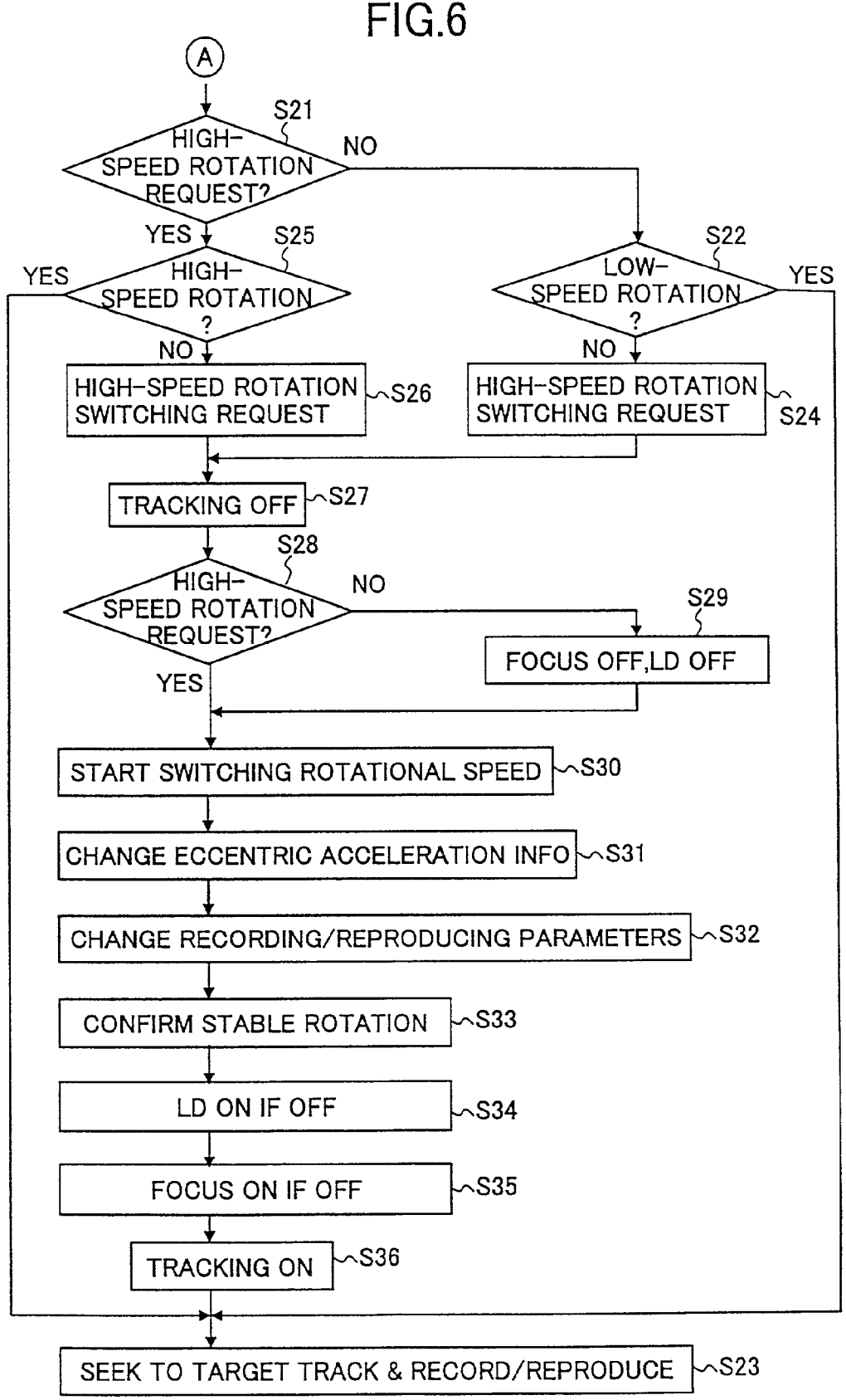
FIG. 6 is a flow chart for explaining the operation of the MPU of the first embodiment.

FIGS. 5 and 6 are flow charts for explaining the operation of the MPU 12 of this embodiment.

In FIG. 5, a step S1 decides whether or not a recording or reproducing instruction is issued from the host unit. If the decision result in the step S1 is YES, a step S2 decides whether or not a normal mode, that is, a low-speed rotation fixed mode of the ZCAV system, is instructed. If the decision result in the step S2 is YES, a step S3 sets a low-speed rotation request, and the process advances to a step S21 shown in FIG. 6 which will be described later.

On the other hand, if the decision result in the step S2 is NO, a kind of mode of the ZCLV system is instructed, and thus, a step S4 decides whether or not the present recording or reproducing position is located at a position recordable or reproducible in the high-speed mode, that is, whether or not the present recording or reproducing position is located on the inner peripheral side of a position where a high-speed rotation is possible. If the decision result in the step S4 is NO, a step S5 decides whether or not the present recording or reproducing position is on the outermost peripheral side of the optical disk 72, that is, in a vicinity of a leading region of the optical disk 72. If the decision result in the step S5 is NO, a step S6 initializes an inner access counter within the MPU 12, a step S7 initializes an inner access time managed within the MPU 12, and the process advances to the step S3. In addition, if the decision result in the step S5 is YES, a step S8 decreases a value of the inner access counter by $\alpha$, a step S9 increases a value of the inner access time by $\beta$, and the process advances to the step S3.

Therefore, in the leading region of the optical disk 72, the conditions for judging continuity of the access is relaxed, so that the rotational speed increases more easily. Regions for managing a state of use of the files, such as a FAT region and a directory region, are provided in the leading region of the optical disk 72. Even when the host unit carries out a sequential process with respect to a region on the inner peripheral side of the optical disk 72, an access to the leading region is generated since the directory region is occasionally updated in order to update or add the file information. Accordingly, by relaxing the conditions for judging the continuity of the access, even if the rotational speed decreases due to the updating of only the directory information during the sequential process, the rotational speed increases before the random access so as to prevent the random access performance from deteriorating.

If the decision result in the step S4 is YES, a step S11 decides whether or not the continuity of the access needs to be judged. The process advances to a step S15 which will be described later if the decision result in the step S11 is NO. ON the other hand, if the decision result in the step S11 is YES, a step S12 increments the inner access counter by one, and a step S13 decides whether or not the value of the inner access counter is greater than or equal to a prescribed value. The process advances to the step S3 if the decision result in the step S13 is NO, and the process advances to a step S14 if the decision result in the step S13 is YES. The step S14 decides whether or not a prescribed time has elapsed from a last outer access which is made in a low-speed mode, and the process advances to the step S3 if the decision result in the step S14 is NO. If the decision result in the step S14 is YES or the decision result in the step S11 is NO, the step S15 sets a high-speed rotation request for recording or reproducing in the high-speed mode, and the process advances to the step S21 shown in FIG. 6.

The prescribed time described above is set so that the rotational speed of the optical disk 72 which once decreases does not easily increase again, to thereby prevent deterioration of the random access performance and the decrease of the data transfer rate which would otherwise occur if the rotational speed were frequently switched.

In FIG. 6, the step S21 decides whether or not the high-speed rotation request exists, and the process advances to a step S22 if the decision result in the step S21 is NO. The step S22 decides whether or not the present mode is the normal mode, that is, the optical disk 72 is undergoing low-speed rotation. If the decision result in the step S22 is YES, a step S23 carries out a seek to a target track on the optical disk 72, to carry out a recording or reproduction. If the decision result in the step S22 is NO, a step S24 sets a low-speed rotation switching request, and the process advances to a step S27 which will be described later.

If the decision result in the step S21 is YES, a step S25 decides whether or not the present mode is the high-speed mode, that is, the optical disk 72 is undergoing a high-speed rotation. The process advances to the step S23 if the decision result in the step S21 is YES. If the decision result in the step S25 is NO or after the step S24, the step S27 turns OFF the tracking servo based on the TES E2. A step S28 decides whether or not the high-speed rotation request exists. If the decision result in the step S28 is NO, a step S29 turns OFF the focus servo based on the FES E1, and turns OFF the laser diode 30-1, in order to prevent the data on the optical disk 72 from being destroyed. If the decision result in the step S28 is YES or after the step S29, a step S30 starts switching of the rotational speed. The switching of the rotational speed may be carried out based on a table which indicates the relationships shown in FIG. 3, for example, by storing the table in the memory 18, for example.

A step S31 changes eccentric acceleration information depending on the new rotational speed of the optical disk 72 after the switching of the rotational speed. The eccentric acceleration information is changed by replacing contents (eccentric acceleration information) of an eccentric acceleration table within the memory 18, for example, or by recalculating the eccentric acceleration information, depending on the new rotational speed. The eccentric acceleration information relates to the acceleration which is generated due to the eccentricity of the optical disk 72, and will be described later. A step S32 changes various recording or reproducing parameters which are used during the recording or reproduction, depending on the new rotational speed. A step S33 confirms the stabilized rotation of the optical disk 72. A step S34 turns ON the laser diode 30-1 if the laser diode 30-1 is OFF. A step S35 turns ON the focus servo if the focus servo is OFF. In addition, a step S36 turns ON the tracking servo if the tracking servo is OFF, and the process advances to the step S23.

By the operation described above, it is possible to carry out a process (1) which switches and sets between the low-speed rotation fixed mode and the rotational speed switching mode, and a process (2) which switches and sets whether or not to judge the continuity of the access in the rotational speed switching mode. The process (1) can be carried out by setting a flag which is used for the decision in the step S2 shown in FIG. 5. In addition, the process (2) can be carried out by setting a flag which is used for the decision in the step S11 shown in FIG. 5 in a state where the process (1) sets the rotational speed switching mode. Methods of setting these flags are not limited to specific methods. For example, a method which sets the mode from the host unit, a method which sets the mode in a nonvolatile memory within the memory 18, and a method which writes mode setting information on the optical disk 72 from the host unit and sets the mode based on the written mode setting information may be used to set these flags.

Figure 8:
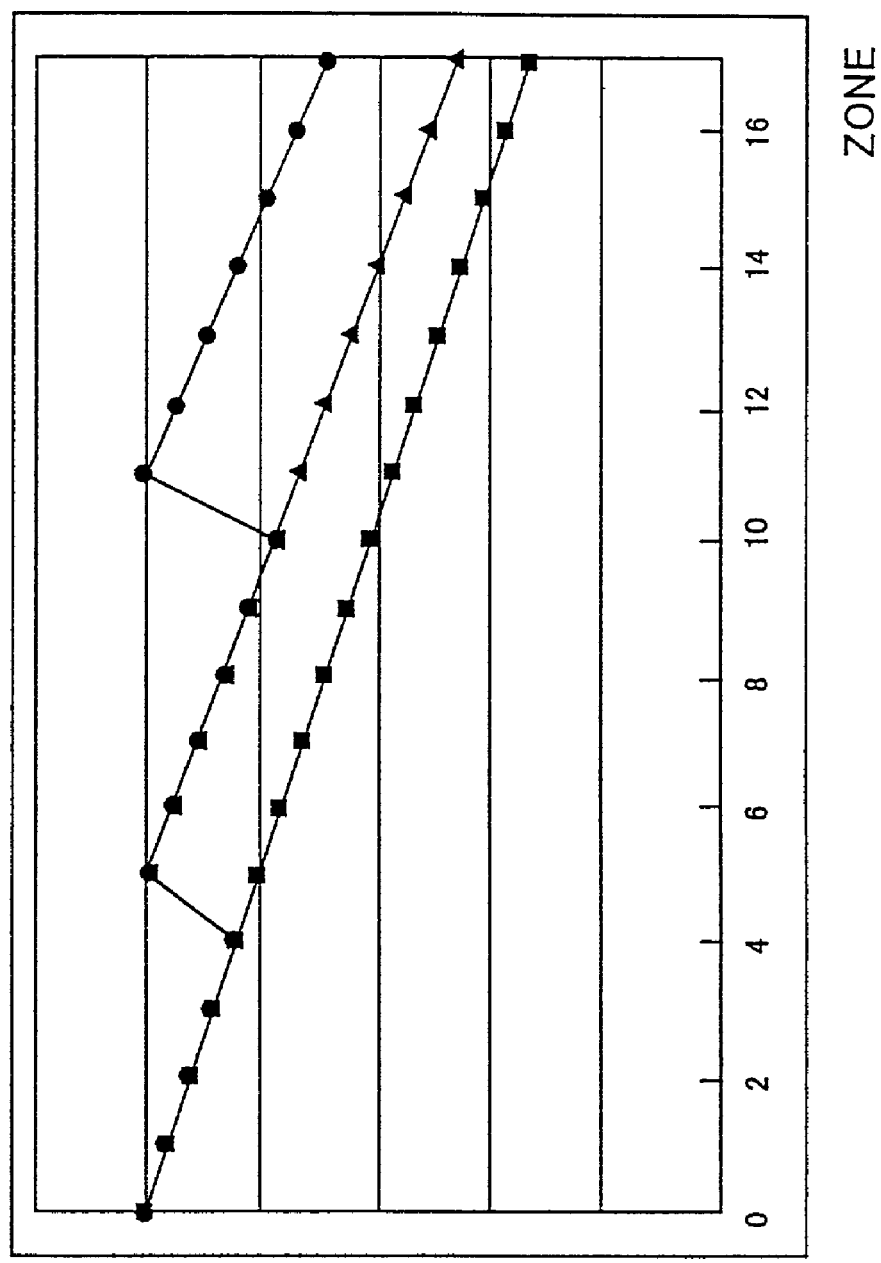
FIG. 8 is a diagram showing the relationships of the zone on the optical disk, a recording or reproducing power and the rotational speed of the optical disk.

The recording or reproducing parameters set in the step S32 shown in FIG. 6 include the recording or reproducing clock frequency and the recording or reproducing power of the laser diode 30-1. FIGS. 7 and 8 are diagrams for explaining the recording or reproducing parameters which are changed.

FIG. 7 is a diagram showing the relationships of the zone on the optical disk 72, the recording or reproducing clock frequency and the rotational speed of the optical disk 72. In FIG. the unit of the recording or reproducing clock frequency is MHz.

FIG. 8 is a diagram showing the relationships of the zone on the optical disk 72, the recording or reproducing power and the rotational speed of the optical disk 72. In FIG. 8, a rectangular mark indicates a case where the rotational speed is 3637 rpm, a triangular mark indicates a case where the rotational speed is 4138 rpm, and a circular mark indicates a case where the rotational speed is 5001 rpm.

For example, as proposed in a Japanese Laid-Open Patent Application No. 11-73669, a test write obtains an error quantity of an optimum recording or reproducing power with respect to a default recording or reproducing power of a power default table, so as to optimize the recording or reproducing power. For this reason, this embodiment does not need to carry out the test write every time the rotational speed is switched. In other words, when the rotational speed is switched, it is only necessary to switch the power default table corresponding to each rotational speed, and the optimum recording or reproducing power at each rotational speed can be optimized by correcting the default recording or reproducing power of the corresponding power default table by the same error quantity.

Furthermore, this embodiment can minimize the processing time, because the process of changing the parameters dependent on the rotational speed of the optical disk 72, such as the eccentric acceleration information and the recording or reproducing parameters, is carried out in parallel with the process of switching the rotational speed.

Figure 9:
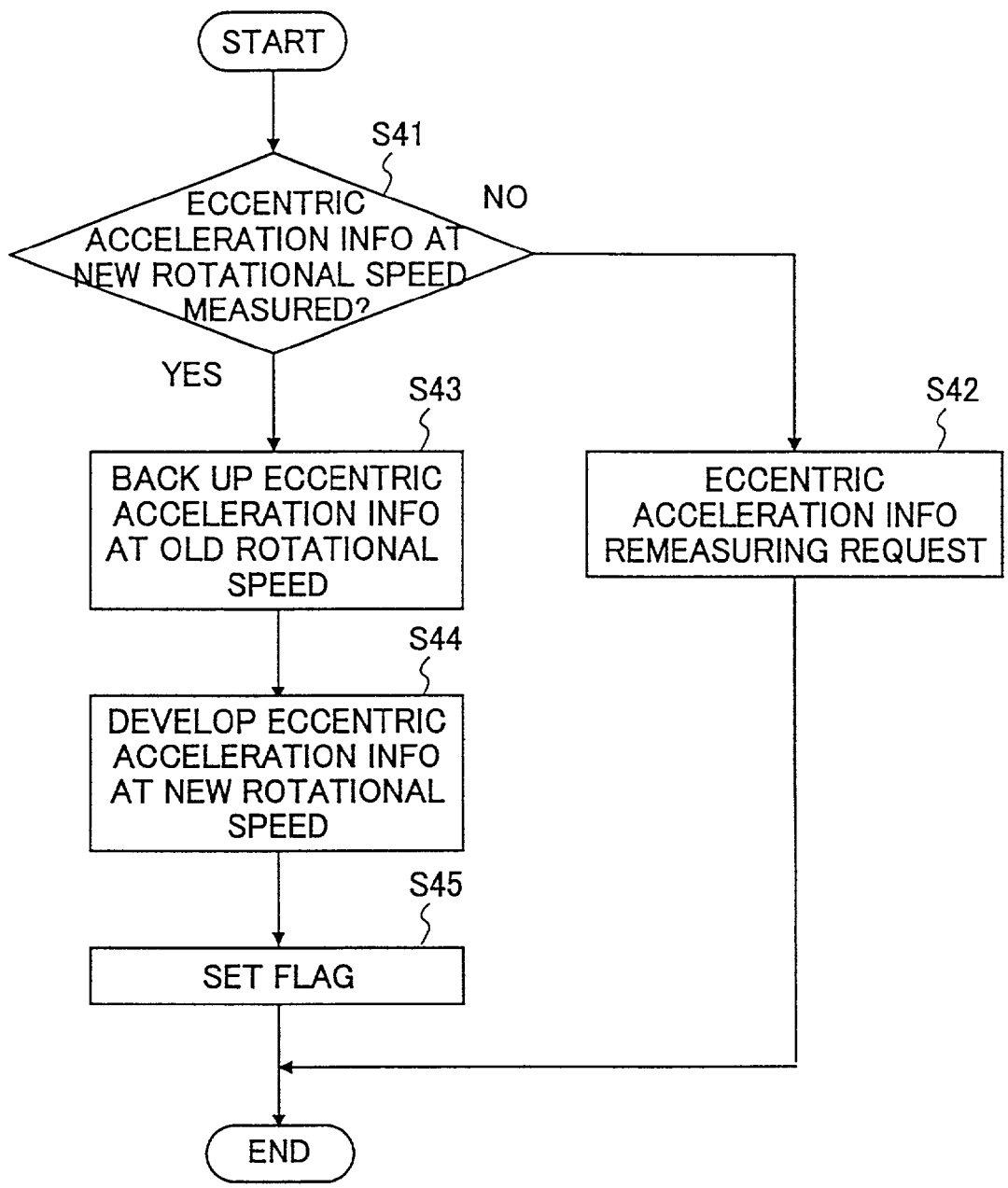
FIG. 9 is a flow chart for explaining an eccentric acceleration information switching process.

FIG. 9 is a flow chart for explaining an eccentric acceleration information switching process of the step S31 shown in FIG. 6. In this embodiment, it is assumed for the sake of convenience that the eccentric acceleration information switching process is carried out by the DSP 16 under the control of the MPU 12. In FIG. 9, a step S41 decides whether or not the eccentric acceleration information at the new rotational speed of the optical disk 72 is already measured in the past. If the decision result in the step S41 is NO, a step S42 sets an eccentric acceleration information remeasuring request, and the process ends. Hence, the eccentric acceleration information at the new rotational speed is measured by a known method and is stored in the eccentric acceleration table. For example, methods of measuring and learning the eccentric acceleration information are proposed in a Japanese Laid-Open Patent Application No. 2000-339729.

On the other hand, if the decision result in the step S41 is YES, a step S43 provides a backup for the eccentric acceleration information corresponding to the old rotational speed and stored in the memory within the DSP 16 or in the memory 18. A step S44 develops the eccentric acceleration information corresponding to the new rotational speed in the memory within the DSP 16 or in the memory 18. A step S45 sets a flag with respect to the eccentric acceleration information corresponding to the old rotational speed, and the process ends.

The eccentric acceleration information changes when the rotational speed of the optical disk 72 changes, and thus, it is necessary to obtain the eccentric acceleration information depending on the rotational speed. Because it takes time to measure and store the eccentric acceleration information, it is desirable not to carry out the process of remeasuring the eccentric acceleration information as much as possible when the rotational speed is switched. Hence, this embodiment decides whether or not the eccentric acceleration information corresponding to the new rotational speed is already measured, and if in the affirmative, this embodiment merely replaces the contents of the eccentric acceleration table, so as to minimize the processing time by omitting the remeasuring process.

Figure 10:
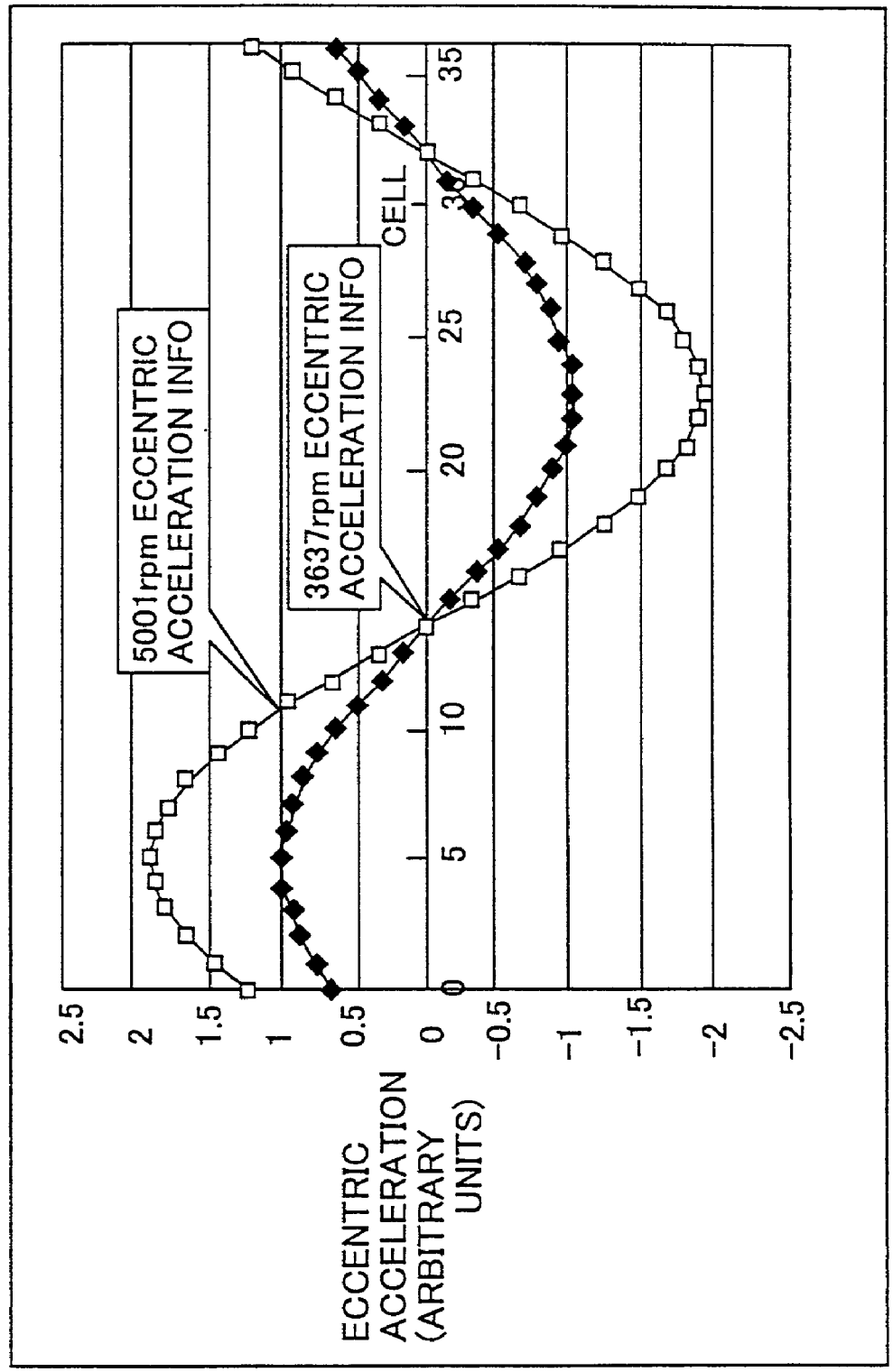
FIG. 10 is a diagram for explaining the eccentric acceleration information switching process.

FIG. 10 is a diagram for explaining the eccentric acceleration information switching process of the step S31 shown in FIG. 6. More particularly, FIG. 10 is a diagram for explaining a case where the eccentric acceleration information is switched by calculation. In FIG. 10, the ordinate indicates the eccentric acceleration in arbitrary units, and the abscissa indicates a memory cell number in the memory within the DSP 16 or in the memory 18. In addition, a rectangular mark indicates the eccentric acceleration corresponding to a case where the rotational speed is 5001 rpm, and a diamond mark indicates the eccentric acceleration corresponding to a case where the rotational speed is 3637 rpm.

In the DSP 16, a reference signal indicating one rotation of the optical disk 72 is generated based on a signal obtained via the read LSI circuit 24 and the ODC 14. This reference signal maintains the relationship with respect to a position along a circumferential direction of the optical disk 72 even when the rotational speed of the optical disk 72 changes. Accordingly, the DSP 16 calculates the eccentric acceleration information (eccentric acceleration transition) amounting to one rotation based on the reference signal, and successively stores the eccentric acceleration information in the memory cell numbers of the memory within the DSP 16 or within the memory 18. For the sake of convenience, FIG. 10 shows a case where the eccentric acceleration information of the eccentric acceleration table corresponding to the rotational speed of 5001 rpm is calculated from the eccentric acceleration information of the eccentric acceleration table corresponding to the rotational speed of 3637 rpm. Accordingly, the eccentric acceleration in this case becomes $(5001/3637)^2$ times when the rotational speed of the optical disk 72 changes, and an eccentric acceleration table is calculated in which the eccentric acceleration information stored in the memory cell numbers is multiplied by $(5001/3637)^2$. Furthermore, since the elapsed time corresponding to one memory cell is multiplied by $(3637/5001)$, if an updating time of the memory cells for the case where the rotational speed is 3637 rpm is denoted by 1, the parameters are set with respect to the DSP 16 so that the memory cells are updated $1 \times (3637/5001)$ at a time for the case where the rotational speed is 5001 rpm.

Therefore, according to this embodiment, it is possible to an optimum random access performance or data transfer rate depending on the needs, by switching the table of the recording or reproducing parameters, such as the recording or reproducing clock frequency, the recording or reproducing power and the eccentric acceleration information, when the rotational speed of the optical disk 72 is switched.

FIG. 11 is a diagram for explaining a buffer region provided on the optical disk 72. As indicated by a rectangular surrounding mark in FIG. 11, the buffer region may be provided at a boundary portion of the optical disk 72 between a region which is accessible in the normal mode and a region which is accessible in the high-speed mode. In this case, when an access request to the region which is accessible in the high-speed mode is generated in the normal mode, it is detected that the access is generated with respect to the region located on the inner peripheral side of the buffer region on the optical disk 72, and the optical disk 82 is rotated at the high rotational speed to switch the mode to the high-speed mode. In other words, the operation of the MPU 12 in this case is substantially the same as the operation of the first embodiment, except that the buffer region is recognized.

When an access request to a certain region on the outer peripheral side of the optical disk 72 is generated in the high-speed mode, and this certain region is the buffer region, it is possible not to immediately switch to the normal mode, but to switch to the normal mode when an access request to a region on the outer peripheral side of the buffer region is generated. In addition, when an access request to a region of the optical disk 72 accessible in the high-speed mode is generated, it is possible not to immediately switch the rotational speed of the optical disk 72 to the high rotational speed, but to measure the state of the access and to switch the rotational speed to the high rotational speed only when an access to a region located on the inner peripheral side of the buffer region of the optical disk 72 is consecutively generated. Moreover, when an access request to a region on the outer peripheral side of the optical disk 72 is generated during access to a region on the inner peripheral side of the optical disk 72 in the high-speed mode, it is also possible to immediately switch the rotational speed of the optical disk 72 to the rotational speed of the region on the outer peripheral side of the optical disk 72.

Accordingly, by providing the buffer region on the optical disk 72 and switching the rotational speed of the optical disk 72 in a hysteresis manner, frequent occurrences of the consecutive access and switching of the rotational speed can be suppressed, so that it is possible to prevent deterioration of the random access performance and the data transfer rate.

As a modification of the first embodiment described above, it is possible to disable the mode switching operation, so that the mode is fixed to the normal mode or the high-speed mode. In this case, the MPU 12 can disable the mode switching operation in response to a mode fixing request from the host unit. Such a mode fixing request may be generated based on an instruction from the user who uses the host unit or, generated by linking with an application software of the host unit.

During a time when the rotational speed of the optical disk 72 is being switched, the data transfer stops and the data transfer rate decreases. Hence, in order to minimize the effects of the switching of the rotational speed on the data transfer rate, it is desirable to secure a predetermined amount of read data in a DRAM within the memory 18 by a preread in the case of a sequential access by a read command, and to secure a predetermined amount of vacant regions for write data in the DRAM in the case of a sequential access by a write command, as will be described later. By taking such measures, it is possible to carry out an access process by maintaining the rotational speed constant in the case of the random access and increasing the rotational speed in the case of the sequential access, based on an access pattern and a data occupied capacity or vacant capacity within the DRAM.

FIG. 12 is a diagram showing a relationship between a physical block (track) address (or LBA: logical block address) and the rotational speed for each zone of the optical disk 72. In the following description, hexadecimal numbers are indicated by adding "h". A zone 0 includes LBAs 0 to FFFh, a zone 1 includes LBAs 1000h to 1FFFh, ..., and a zone n includes LBAs n×1000h to (n×1000+FFFh). In addition, it is assumed that the ZCAV system is normally employed, and the optical disk 72 is rotated at a constant rotational speed for all zones.

Figure 13:
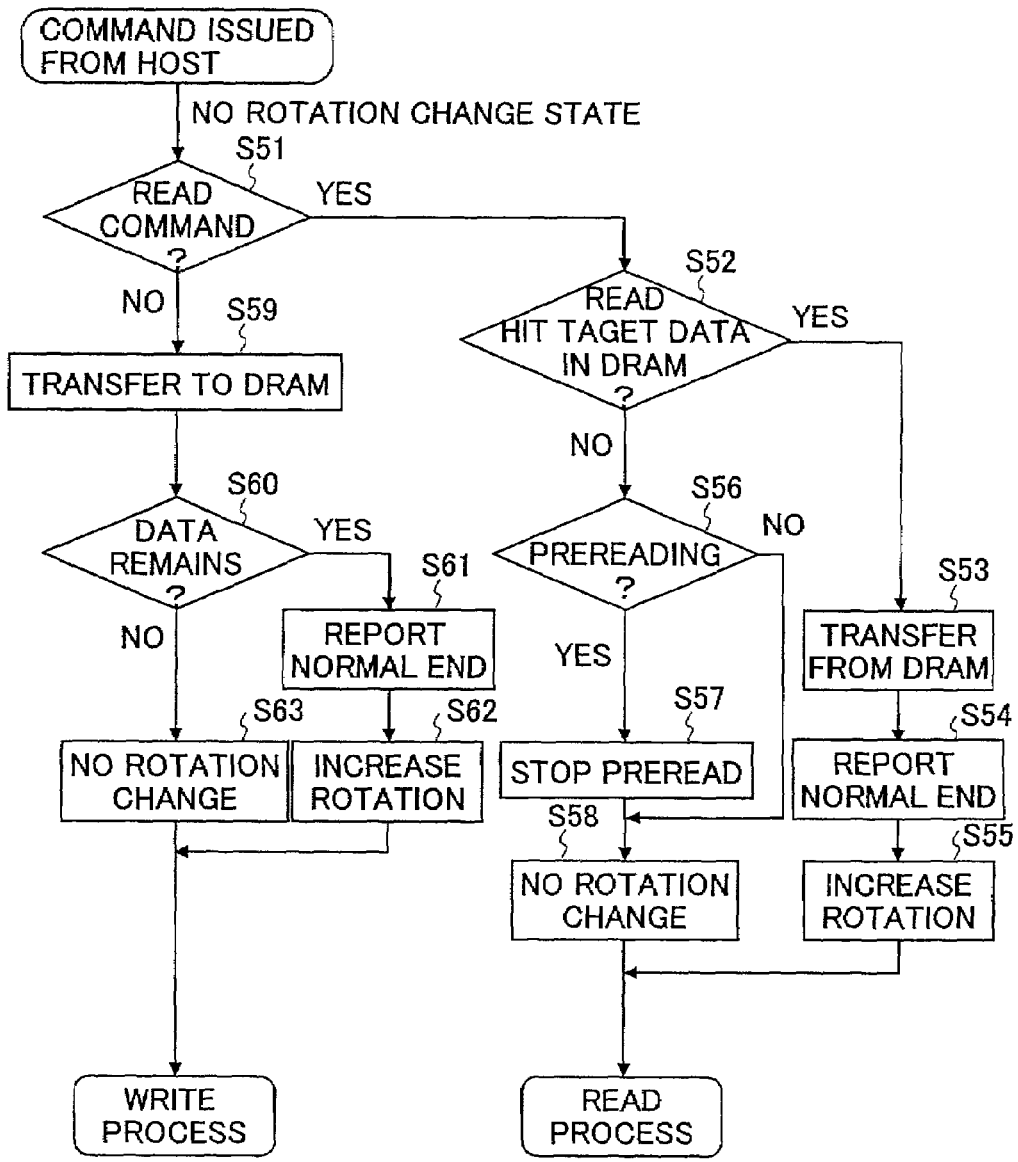
FIG. 13 is a flow chart for explaining a rotational speed control in the first embodiment.

FIG. 13 is a flow chart for explaining a rotational speed control based on a state within the DRAM in this first embodiment. The process shown in FIG. 13 is carried out by the MPU 12, and is related to the step S11 shown in FIG. 5 which decides whether or not the continuity of the access needs to be judged.

In FIG. 13, a step S51 decides whether or not a command issued from the host unit is a read command #A1 with respect to the zone 1. If the decision result in the step S51 is YES, a step S52 decides whether or not read data exist in the DRAM. Initially, the data with respect to the read command #A1 does not exist in the DRAM, and the data of the read command #A1 is read from the optical disk 72, and then, the optical disk unit carries out a preread to read data following the read command #A1 into the DRAM. In other words, if the decision result in the step S52 is NO, a step S56 decides whether or not a preread is being carried out, and a step S57 stops the preread if the decision result in the step S56 is YES. If the decision result in the step S56 is NO or after the step S57, a step S58 judges that the rotational speed is not changed (switched), and the process advances to a read process.

Next, when a read command #A2 is issued from the host unit, the step S52 decides whether or not the read data of the read command #A2 exist in the DRAM. This time, the read data of the read command #A2 is already read into the DRAM by the preread, and thus, the read data of the read command #A2 can be transferred from the DRAM without having to read the read data from the optical disk 72. Hence, if the decision result in the step S52 is YES, a step S53 transfers the read data of the read command #A2 from the DRAM to the host unit, and a step S54 reports a normal end of the transfer to the host unit. In this case, the operation on the optical disk 72 and the operation with respect to the host unit do not need to match, and for this reason, the operation on the optical disk 72 becomes inconspicuous from the point of view of the operation of the host unit. Accordingly, a step S55 increases the rotational speed at this timing, and the process then advances to the read process.

Figure 14:
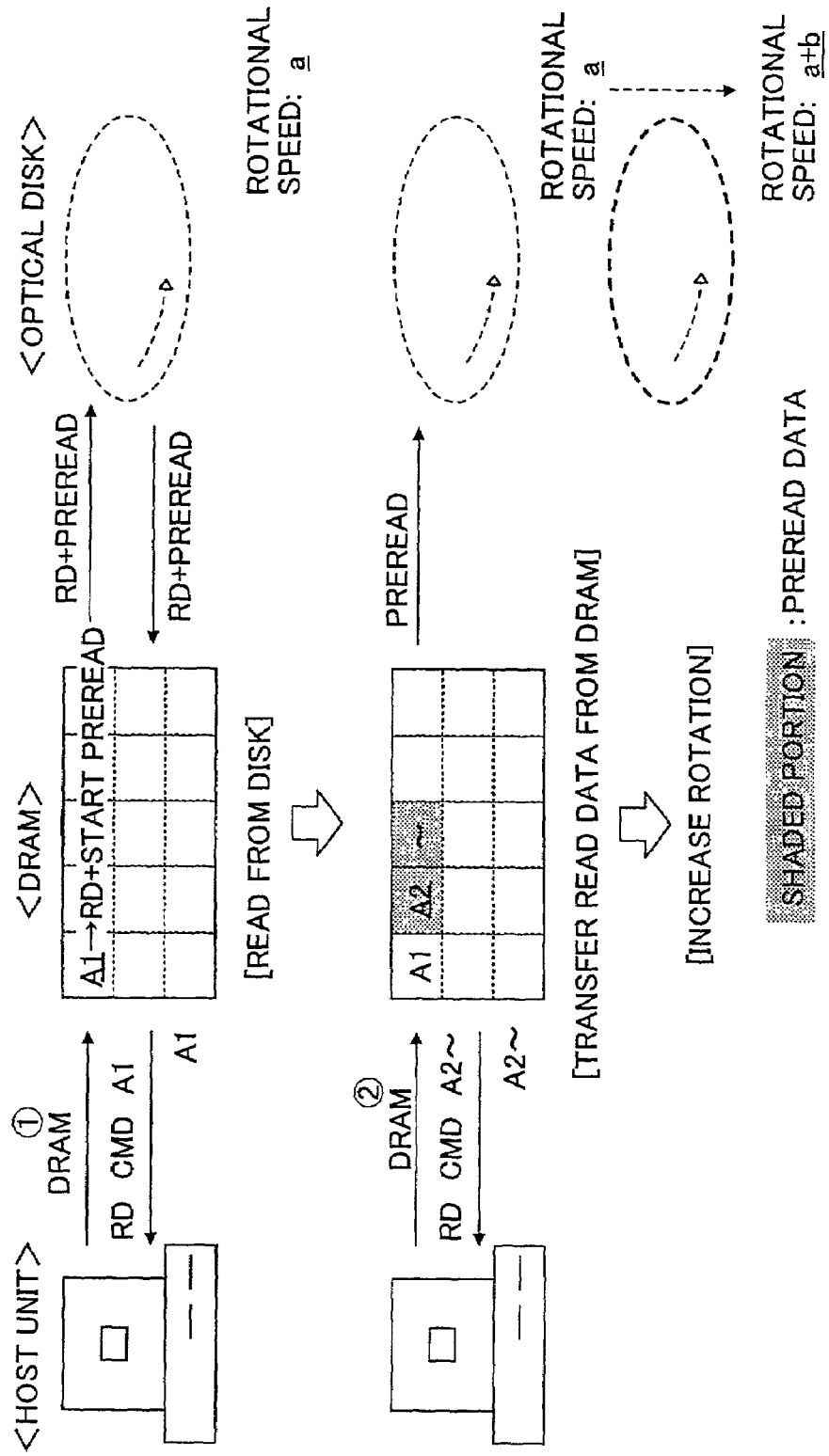
FIG. 14 is a diagram for explaining a rotational speed increasing process and a read data flow in the first embodiment.

FIG. 14 is a diagram for explaining a rotational speed increasing process and a read data flow in this first embodiment. In FIG. 14, RD denotes a read, CMD denotes a command, and a shaded portion denotes a preread data. In addition, the initial state of the DRAM is indicated by ①, and a next state of the DRAM is indicated by ②.

Accordingly, during the read process, the rotational speed for each zone is not switched immediately. Instead, read hit target data in the DRAM are monitored, and the rotational speed is increased only when the hit target exists, while the rotational speed is not increased if no hit target exists. As a result, even when the read command is received during the change of the rotational speed, the read data in the DRAM are transferred so that the change in the rotational speed does not affect the host unit.

For example, the read commands from the host unit include the following.

A1. Read Command: LBA=1100h/No. of Blocks=10h
A2. Read Command: LBA=1110h/No. of Blocks=10h
A3. Read Command: LBA=1120h/No. of Blocks=10h
...
An. Read Command: LBA=(1100h+10h×n)/No. of Blocks=10h Next, when a write command #B1 with respect to the zone 1 is received from the host unit, the decision result in the step S51 becomes NO. In this case, a step S59 transfers write data from the host unit to the DRAM, and a step S60 decides whether or not data to be transferred remains. If the decision result in the step S60 is NO, a step S63 judges that there is no change (switching) of the rotational speed, and the process advances to a write process. On the other hand, if the decision result in the step S60 is YES, a step S61 reports a normal end of the transfer to the host unit. In addition, a step S62 increases the rotational speed, and the process advances to the write process.

In other words, although a confirmation is made to determine whether or not the write data exist in the DRAM, no write is being made initially, and thus, no write data exist in the DRAM. Hence, the write data of the write command #B1 are transferred to the DRAM and are also written on the optical disk 72. Then, the normal end of the transfer is reported to the host unit at the same time as when the transfer ends. In this state, the operation on the optical disk 72 and the operation with respect to the host unit do not need to match, and for this reason, the operation on the optical disk 72 becomes inconspicuous from the point of view of the operation of the host unit. Accordingly, the rotational speed is changed at this timing.

Figure 15:
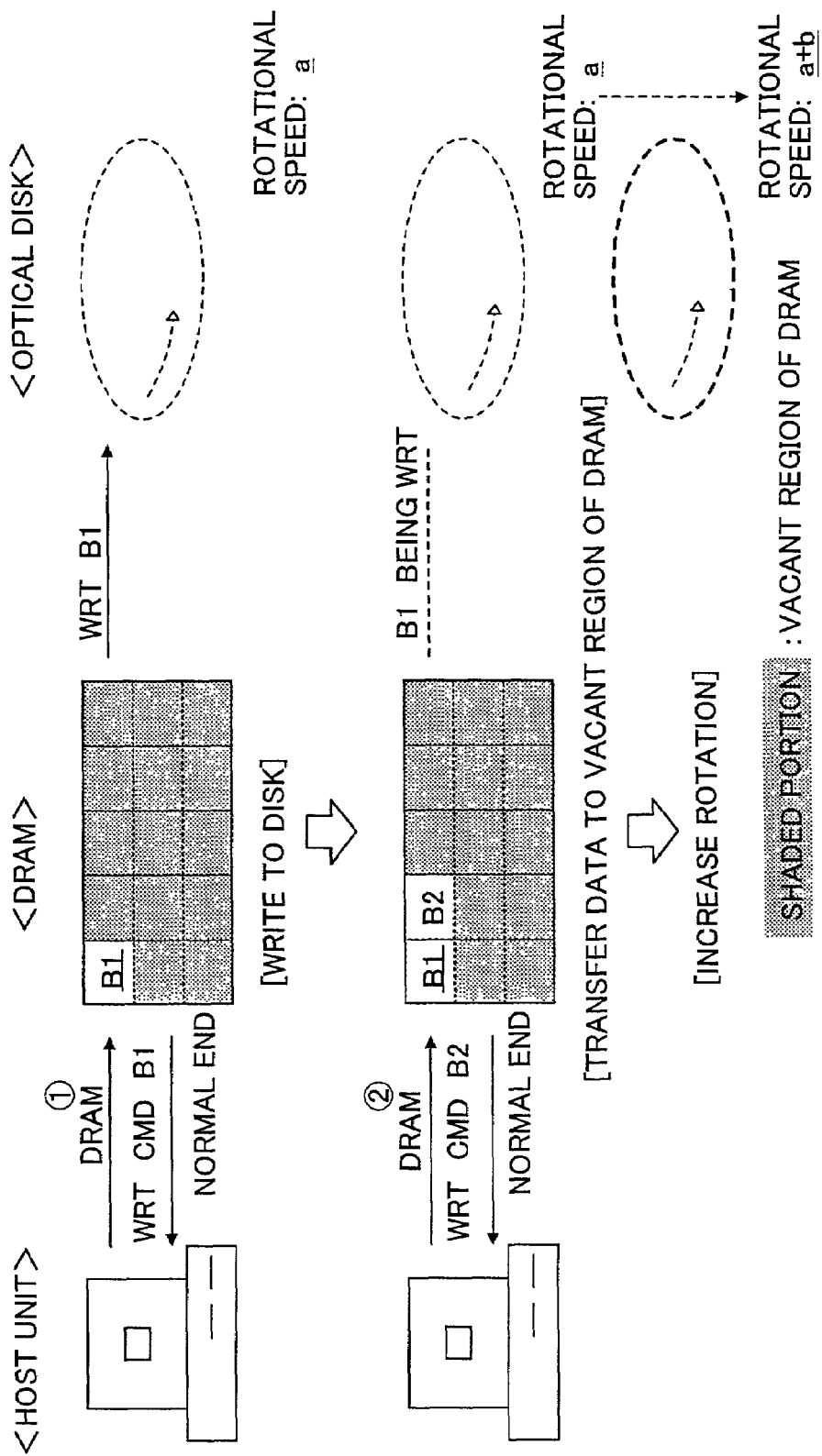
FIG. 15 is a diagram for explaining the rotational speed increasing process and a write data flow in the first embodiment.

FIG. 15 is a diagram for explaining the rotational speed increasing process and a write data flow in this first embodiment. In FIG. 15, WRT denotes a write, CMD denotes a command, and a shaded portion denotes a vacant region. In addition, the initial state of the DRAM is indicated by ①, and a next state of the DRAM is indicated by ②.

Accordingly, during the write process, the rotational speed for each zone is not switched immediately. Instead, a vacant capacity in the DRAM is monitored, and the rotational speed is increased only when the vacant capacity exists, while the rotational speed is not increased if no vacant capacity exists. As a result, even when the write command is received during the change of the rotational speed, the write data are transferred to the vacant regions of the DRAM so that the change in the rotational speed does not affect the host unit.

For example, the write commands from the host unit include the following.

B1. Write Command: LBA=1100h/No. of Blocks=10h
B2. Write Command: LBA=1110h/No. of Blocks=10h
...
B3. Write Command: LBA=1120h/No. of Blocks=10h
Bn. Write Command: LBA=(1100h+10h×n)/No. of Blocks=10h Next, a description will be given of second through seventh embodiments of the storage apparatus according to the present invention. The construction of each of the second through seventh embodiments of the storage apparatus is the same as the construction of the first embodiment of the storage apparatus described above in conjunction with FIGS. 1 and 2, and an illustration thereof will be omitted. In the second through seventh embodiments of the storage apparatus, the present invention is applied to an optical disk unit. In addition, the second through seventh embodiments of the storage apparatus respectively employ second through seventh embodiments of the rotation control method according to the present invention.

Figure 16:
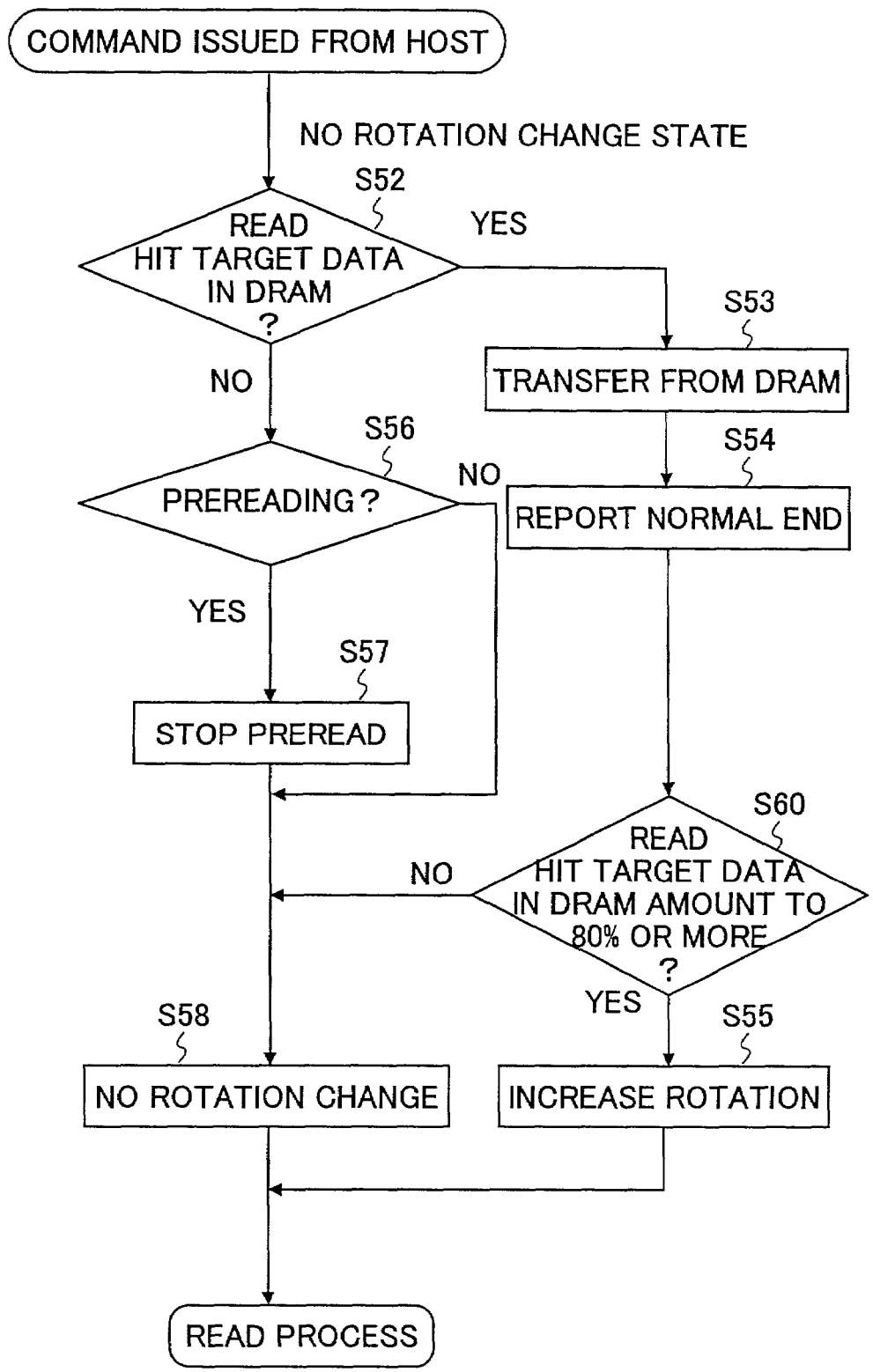
FIG. 16 is a flow chart for explaining the rotational speed control in a second embodiment.

FIG. 16 is a flow chart for explaining the rotational speed control based on a state within the DRAM in the second embodiment. The process shown in FIG. 16 is carried out by the MPU 12, and is related to the step S11 shown in FIG. 5 which decides whether or not the continuity of the access needs to be judged. In FIG. 16, those steps which are the same as those corresponding steps in FIG. 13 are designated by the same reference numerals, and a description thereof will be omitted. In addition, an illustration of those steps carried out when the command is the write command will be omitted in FIG. 16.

In this embodiment, a DRAM region is regarded as one section, where one section is made up of 200h blocks, as will be described later in conjunction with FIG. 20. Furthermore, it is assumed that the data transfer rate required by the host unit is 0.4 Mbyte/s. In the following description, BC denotes a block.

In FIG. 16, after the step S54, a step S60 decides whether or not the read hit target data in the DRAM amounts to 80% or more of the DRAM region. The process advances to the step S58 if the decision result in the step S60 is NO, and the process advances to the step S55 if the decision result in the step S60 is YES.

In other words, when a read command #C1 with respect to the zone 1 is issued from the host unit, a confirmation is made to determine whether or not the read data exists in the DRAM. Initially, the data with respect to the read command #C1 do not exist in the DRAM, and thus, the data of the read command #C1 are read from the optical disk 72. Then, in optical disk unit, a preread is carried out to read the data following the read command #C1 into the DRAM.

Next, it is assumed for the sake of convenience that a read command #C2 is issued from the host unit. In this case, a confirmation is made to determine whether or not the read data exists in the DRAM, similarly as described above. This time, however, data amounting to 30h blocks are already read into the DRAM by the preread, and the data of the read command #C2 can be transferred from the DRAM to the host unit without having to read the data from the optical disk 72. In the first embodiment described above, the rotational speed is changed at this timing, but there is a possibility that only the data of LBA=1100h to LBA=113Fh exist in the DRAM and a read command with respect to the data which have not yet been read into the DRAM may be received from the host unit during the changing of the rotational speed. In such a situation, it becomes necessary to read the data from the optical disk 72 after the rotational speed is changed, thereby delaying the transfer of the data with respect to the host unit.

If a large amount of read data is held in the DRAM region, it is possible to positively transfer the data to the host unit from the DRAM. Hence, in this second embodiment, the rotational speed is changed when the read commands amounting to W % or more of the DRAM region are held in the DRAM. For example, when W=80%, the rotational speed is changed if the read data amounting to 190h or more are held in the DRAM, since the DRAM region amounts to 200h.

Figures 17, 18:
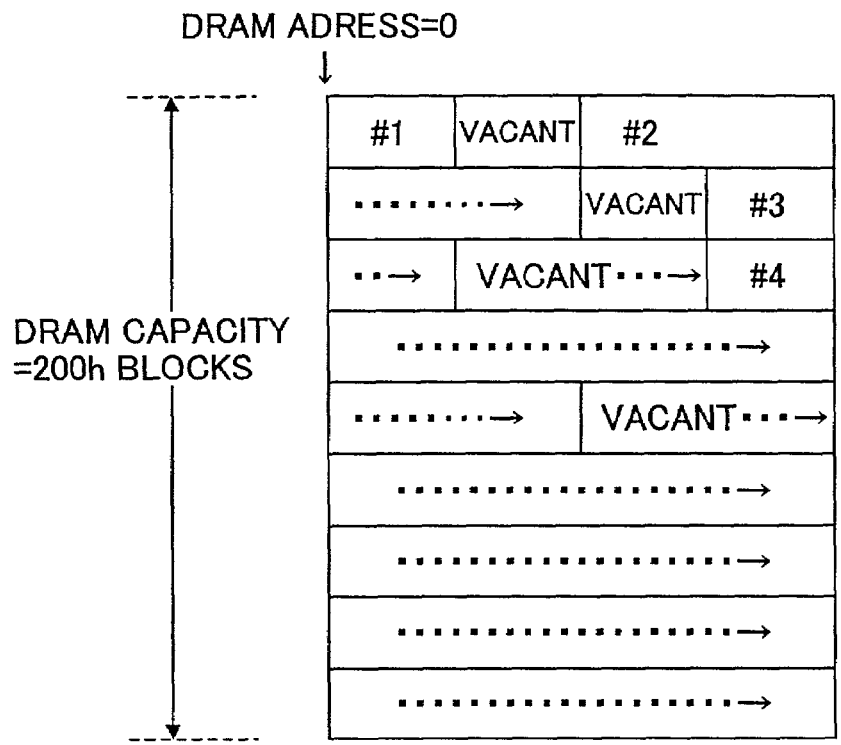
FIG. 17 is a diagram showing read hit target data and vacant regions of a DRAM.
FIG. 18 is a diagram showing a table for managing the read hit target data.

FIG. 17 is a diagram showing read hit target data and vacant regions of the DRAM. In FIG. 17, #1, . . . denote read commands, and "vacant" denotes the vacant region of the DRAM. In addition, FIG. 18 is a diagram showing a table for managing the read hit target data. In FIG. 18, #1, . . . denote read commands, a "BC Number" denotes the number of blocks, and "ADR of First LBA" denotes an address of the DRAM where the first LBA is stored. The table shown in FIG. 18 may be stored in an internal memory of the MPU 12 or, in a SRAM or the like within the memory 18.

In the description of the third and subsequent embodiments which will be given later, the same designations are used as in FIGS. 17 and 18.

Figure 19:
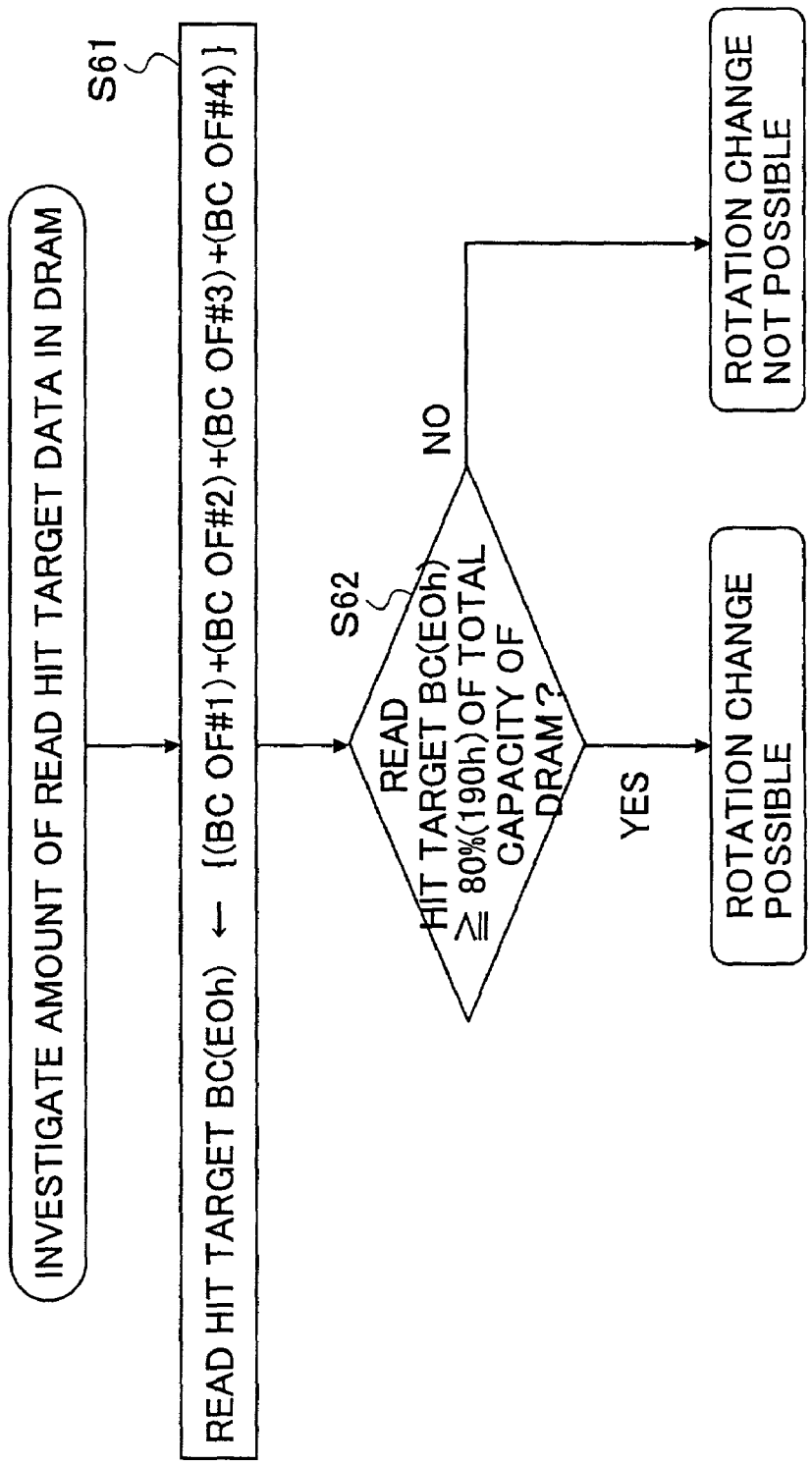
FIG. 19 is a flow chart for explaining a process of investigating an amount of read hit target data in the DRAM.

FIG. 19 is a flow chart for explaining a process of investigating an amount of read hit target data in the DRAM in the step S60 shown in FIG. 16. In FIG. 19, a step S61 sets the number of read hit target blocks (BC number E0h of the read hit target) to a sum of the BC number of the read command #1, the BC number of the read command #2, the BC number of the read command #3, and the BC number of the read command #4, for example. A step S62 decides whether or not the BC number (E0h) of the read hit target is 80% (190h) or more of the total capacity of the DRAM, for example. If the decision result in the step S62 is YES, it is judged that the rotational speed can be changed, and the process advances to the step S55 shown in FIG. 16. On the other hand, if the decision result in the step S62 is NO, it is judged that the rotational speed cannot be changed, and the process advances to the step S58 shown in FIG. 16.

Figure 20:
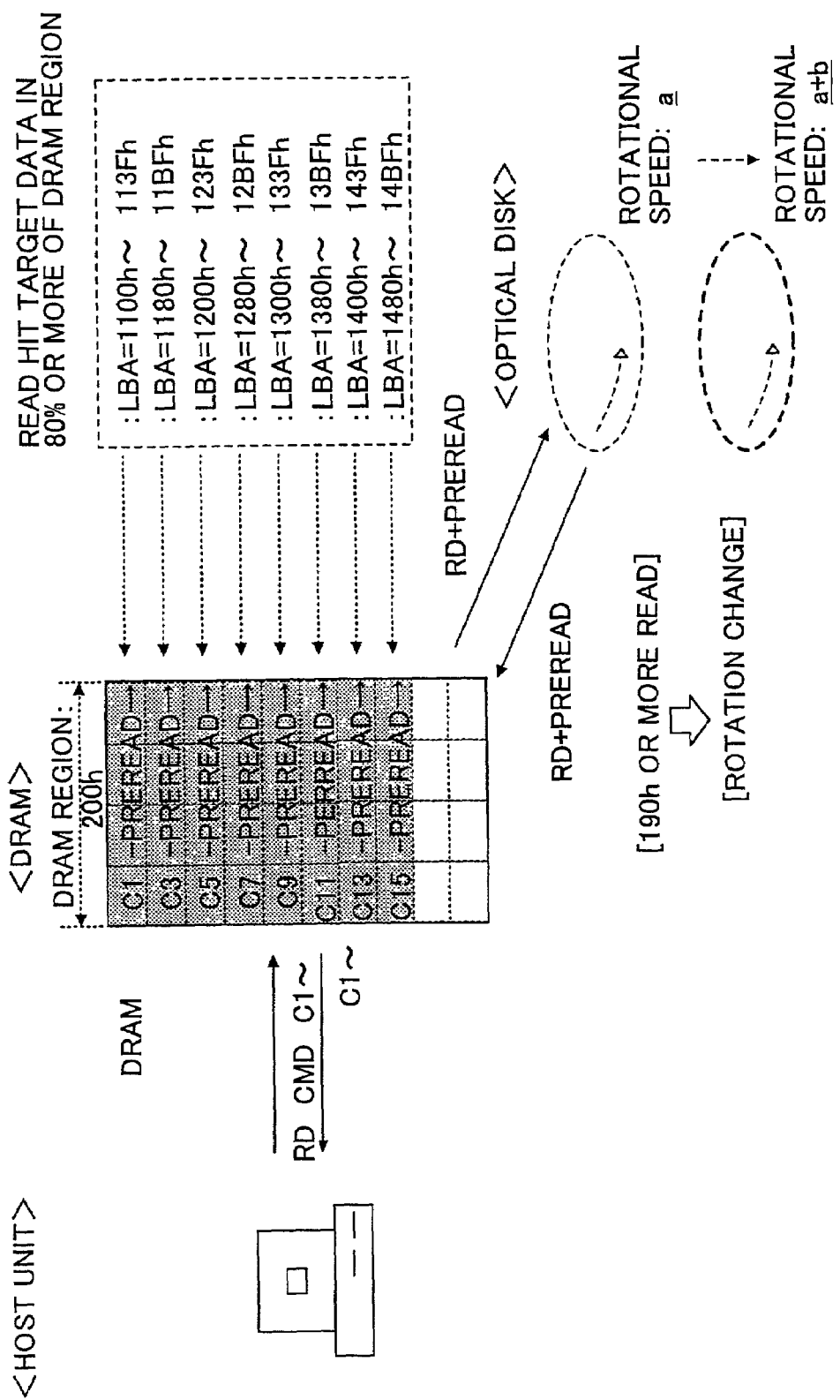
FIG. 20 is a diagram for explaining the rotational speed increasing process and the read hit target data in the DRAM in the second embodiment.

When the read commands are processed similarly up to a read command #C15, the read hit target data in the DRAM amounts to 190h or more as shown in FIG. 20, and the rotational speed is changed at this timing. FIG. 20 is a diagram for explaining a rotational speed increasing process and the read hit target data in the DRAM in this second embodiment. In FIG. 20, RD denotes a read, CMD denotes a command, and a shaded portion denotes a preread data.

Hence, during the read process, even if the read hit target data exist in the DRAM, the rotational speed is not switched immediately for each zone, and the rotational speed is not increased unless the read hit target data within the DRAM amounts to W % or more of the total capacity of the DRAM. Accordingly, even when the read command is received during the change of the rotational speed, the read data in the DRAM are transferred to the host unit, so that the change of the rotational speed will not affect the host unit.

For example, the read commands from the host unit include the following.

C1. Read Command: LBA=1100h/No. of Blocks=10h
C2. Read Command: LBA=1110h/No. of Blocks=10h
C3. Read Command: LBA=1180h/No. of Blocks=10h
C4. Read Command: LBA=1190h/No. of Blocks=10h
C5. Read Command: LBA=1200h/No. of Blocks=10h
C6. Read Command: LBA=1210h/No. of Blocks=10h
C7. Read Command: LBA=1280h/No. of Blocks=10h
C8. Read Command: LBA=1290h/No. of Blocks=10h
C9. Read Command: LBA=1300h/No. of Blocks=10h
C10. Read Command: LBA=1310h/No. of Blocks=10h
C11. Read Command: LBA=1380h/No. of Blocks=10h
C12. Read Command: LBA=1390h/No. of Blocks=10h
C13. Read Command: LBA=1400h/No. of Blocks=10h
C14. Read Command: LBA=1410h/No. of Blocks=10h
C15. Read Command: LBA=1480h/No. of Blocks=10h
C16. Read Command: LBA=1490h/No. of Blocks=10h
. . .
Cn-1. Read Command: LBA=1130h/No. of Blocks=10h
Cn. Read Command: LBA=1190h/No. of Blocks=10h
. . .

Figure 21:
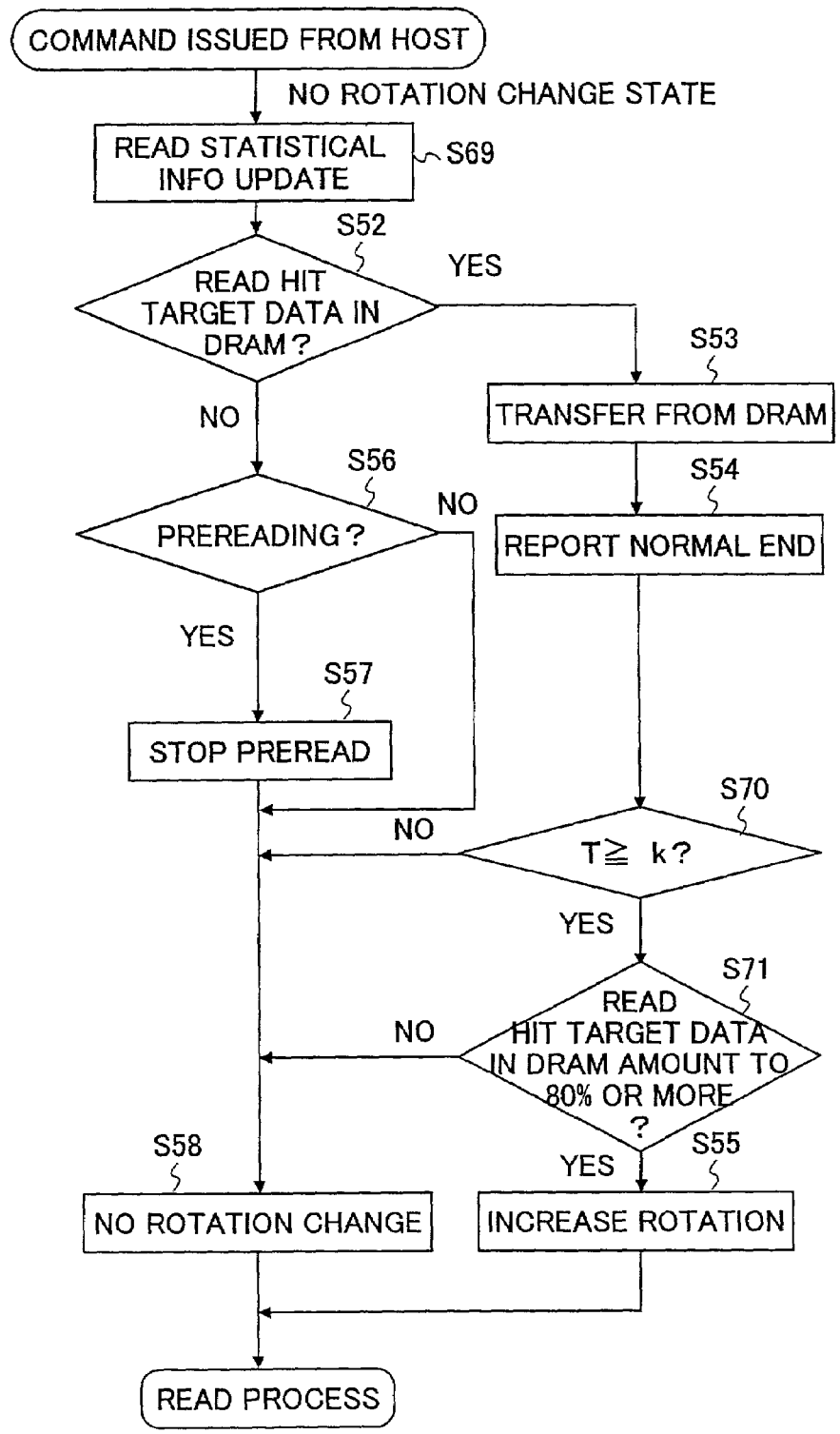
FIG. 21 is a flow chart for explaining the rotational speed control in a third embodiment.

FIG. 21 is a flow chart for explaining a rotation control based on a state within the DRAM in a third embodiment. The process shown in FIG. 21 is carried out by the MPU 12, and is related to the step S11 shown in FIG. 5 which decides whether or not the continuity of the access needs to be judged. In FIG. 21, those steps which are the same as those corresponding steps in FIG. 13 are designated by the same reference numerals, and a description thereof will be omitted. Furthermore, an illustration of those steps carried out when the command is the write command will be omitted in FIG. 21.

Figure 26:
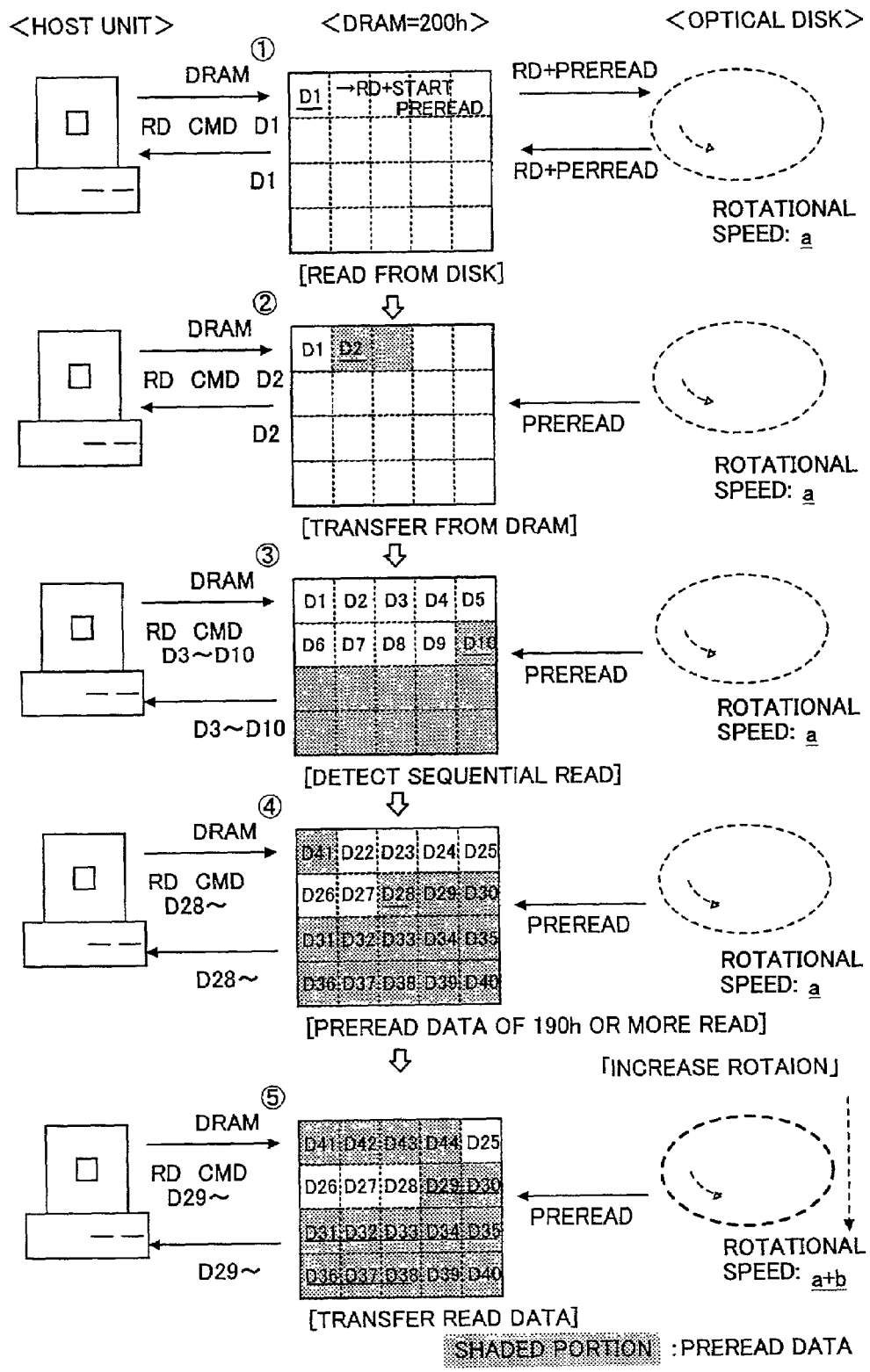
FIG. 26 is a diagram for explaining the rotational speed increasing process and the read data flow in the third embodiment.

In this embodiment, a DRAM region is regarded as one section, where one section is made up of 200h blocks, as will be described later in conjunction with FIG. 26. Furthermore, it is assumed that the data transfer rate required by the host unit is 0.4 Mbyte/s. It is also assumed that a time required for the change of the rotational speed of the optical disk 72, that is, a time required for the rotational speed to stabilize after the rotational speed is switched, is 0.5 seconds (s), for example. Moreover, the read hit target data in the DRAM are limited to the sequential data, and the rotational speed is changed when the amount of data stored in the DRAM becomes greater than or equal to a predetermined value, similarly as in the case of the second embodiment described above.

In FIG. 21, when the command issued from the host unit is a read command, a step S69 carries out a read statistical information updating process so as to update a total number T of sequential blocks which will be described later, and the process advances to the step S52. In addition, after the step S54, a step S70 decides whether or not the total number T of sequential blocks is greater than or equal to a statistical information reference value k. The process advances to the step S58 if the decision result in the step S70 is NO, and the process advances to a step S71 if the decision result in the step S70 is YES. The step S71 decides whether or not the read hit target data in the DRAM amounts to 80% or more of the total capacity of the DRAM. The process advances to the step S58 if the decision result in the step S71 is NO, and the process advances to the step S55 if the decision result in the step S71 is YES.

In other words, when a read command #D1 with respect to the zone 1 is first issued from the host unit, access pattern information of the LBA and the number of blocks is stored in the DRAM or the SRAM within the memory 18, as the read statistical information. Initially, the data with respect to the read command #D1 do not exist in the DRAM, and thus, the data of the read command #D1 are read from the optical disk 72. Then, the optical disk unit carries out a preread to read the data following the read command #D1 into the DRAM. Next, when a read command #D2 is issued from the host unit, the access pattern information of the LBA and the number of blocks is stored as the read statistical information, and a confirmation is made to determine whether or not the read data exist in the DRAM, similarly as described above. This time, since the data amounting to 40h blocks are already read into the DRAM by the preread, the data of the read command #D2 are transferred from the DRAM to the host unit, without having to read the data from the optical disk 72.

Next, when a read command #D3 is issued from the host unit, a process is carried out similarly as described above. Thereafter, when similar processes are carried out with respect to the read commands up to a read command #D10, the read statistical information reaches the reference value k. Various settings are possible for the reference value k, but in this case, it is determined that the access is a sequential read access when the read commands are sequential and the total number of processed blocks becomes 100h or greater. In this state, the rotational speed is changed when the read hit target data in the DRAM amount to X % or more of the total capacity of the DRAM, that is, the DRAM region. In this embodiment, when X=80%, the rotational speed is changed when the read hit target data in the DRAM amount to 190h or more, but since the read hit target data only amount to 120h in this state, the rotational speed is not changed. When a read command #D23 is received, sequential read hit target data amounting to 190h or more exist in the DRAM as shown in FIG. 26, and the rotational speed is changed at this timing. FIG. 26 is a diagram for explaining the rotational speed increasing process and the read data flow in this third embodiment. In FIG. 26, RD denotes a read, CMD denotes a command, and a shaded portion denotes a preread data. In addition, ① through ⑤ respectively indicate the states of the DRAM from the initial state to the state where the read data are transferred.

Figure 22:
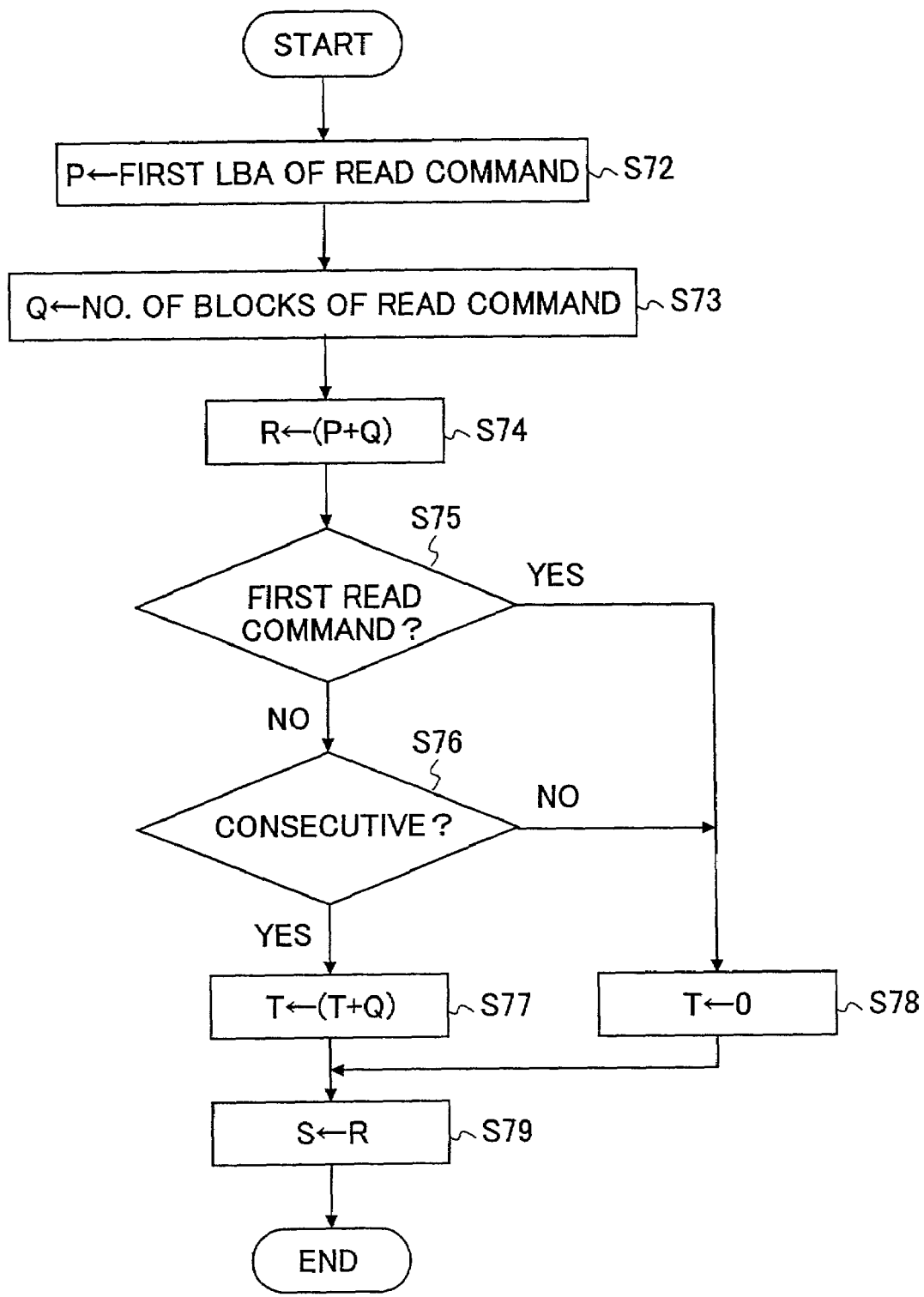
FIG. 22 is a flow chart for explaining a read statistical information updating process.

FIG. 22 is a flow chart for explaining the read statistical information updating process of the step S69 shown in FIG. 21. In FIG. 22, R denotes a last LBA of the read command, S denotes a last LBA of the previous read command, and T denotes a total number of sequential blocks.

In FIG. 22, a step S72 sets P to a first LBA of the read command, and a step S73 sets Q to the number of blocks of the read command. A step S74 sets P+Q to R. A step S75 decides whether or not the first read command is received. The process advances to a step S76 if the decision result in the step S75 is NO. The step S76 decides whether or not P and S are consecutive. If the decision result in the step S76 is YES, a step S77 increases the value of T by setting T+Q to T. On the other hand, if the decision result in the step S75 is YES or, if the decision result in the step S76 is NO, a step S78 clears the value of T by setting 0 to T. After the step S77 or S78, a step S79 updates the value of S by setting R to S, and the process ends.

Figures 23, 24:
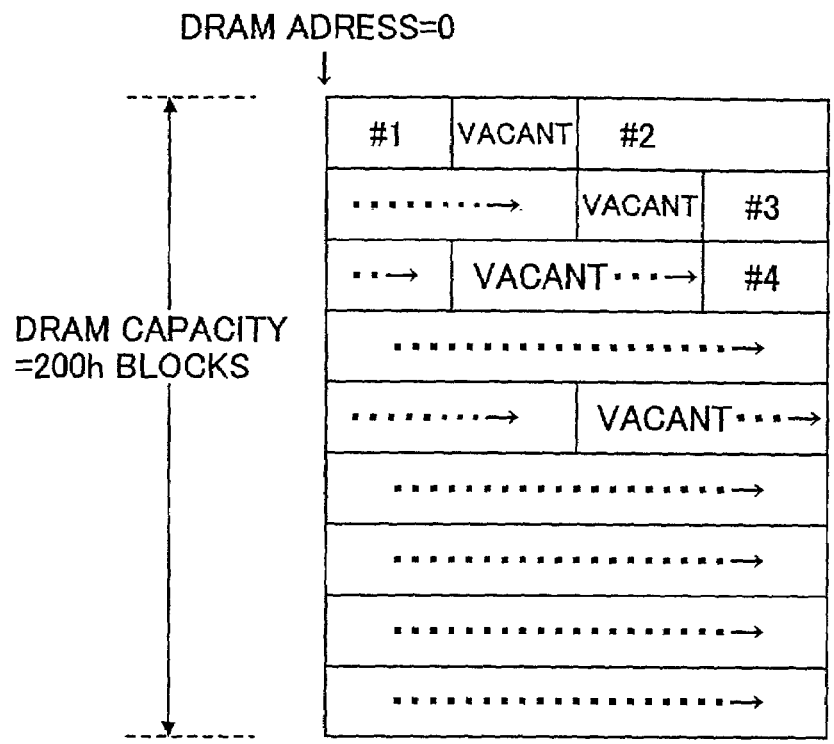
FIG. 23 is a diagram showing the read hit target data and the vacant regions of the DRAM.
FIG. 24 is a diagram showing the table for managing the read hit target data.

FIG. 23 is a diagram showing the read hit target data and the vacant regions of the DRAM. In addition, FIG. 24 is a diagram showing a table for managing the read hit target data.

Figure 25:
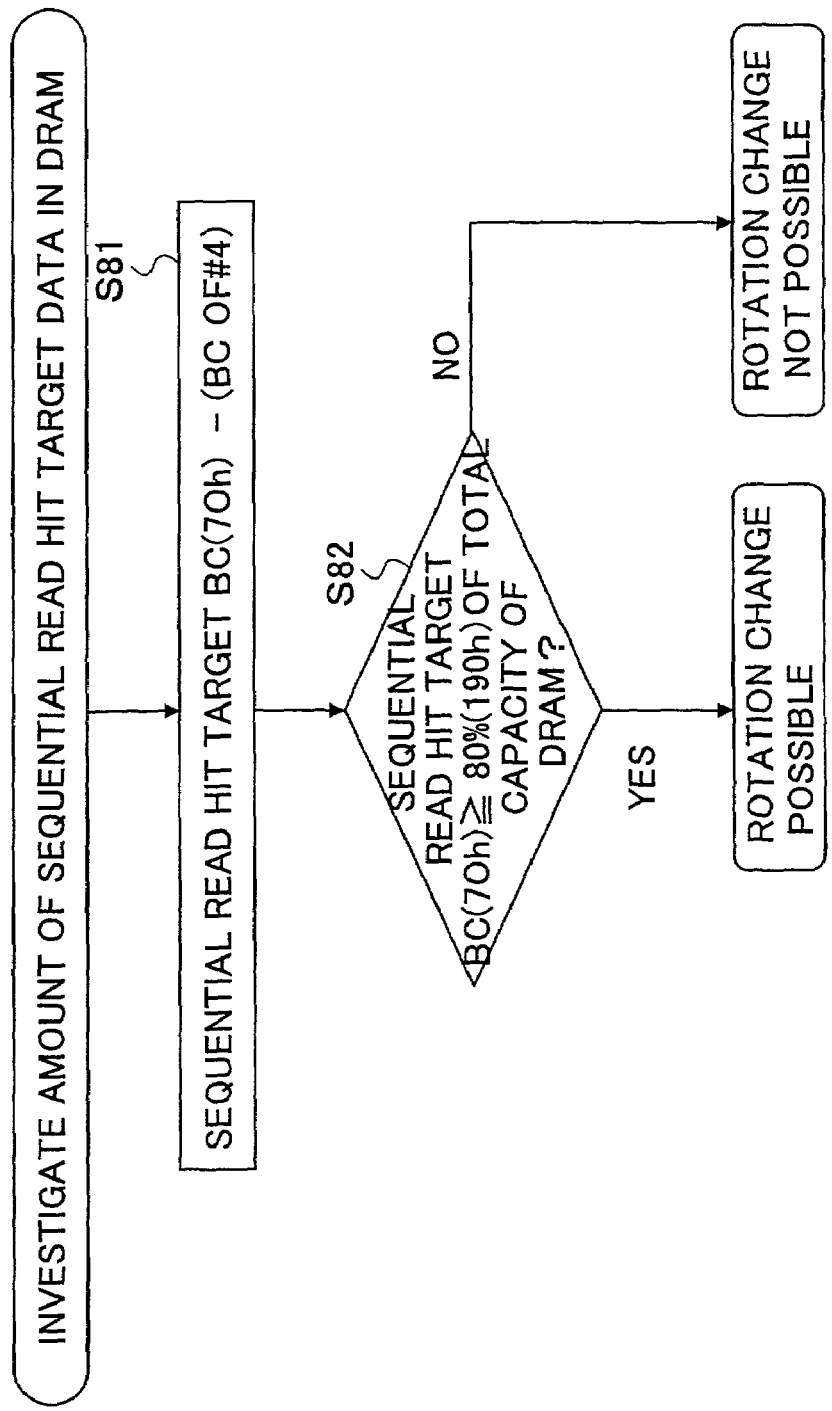
FIG. 25 is a flow chart for explaining the process of investigating the amount of read hit target data in the DRAM.

FIG. 25 is a flow chart for explaining the process of investigating the amount of read hit target data in the DRAM carried out by the step S71 shown in FIG. 21. In FIG. 25, a step S81 sets the number of read hit target blocks (BC number 70h of the read hit target) to the BC number of the read command #4, for example. A step S82 decides whether or not the BC number (70h) of the read hit target is 80% (190h) or more of the total capacity of the DRAM, for example. If the decision result in the step S82 is YES, it is judged that the rotational speed can be changed, and the process advances to the step S55 shown in FIG. 16. On the other hand, if the decision result in the step S82 is NO, it is judged that the rotational speed cannot be changed, and the process advances to the step S58 shown in FIG. 16.

Accordingly, the command which is received from the host unit while the rotational speed is being changed is specified by detecting the sequential read access, during the read process. The change of the rotational speed will not affect the host unit, by increasing the rotational speed when the specified read data amount to X % or more of the total capacity of the DRAM.

For example, the read commands from the host unit include the following.

Figure 27:
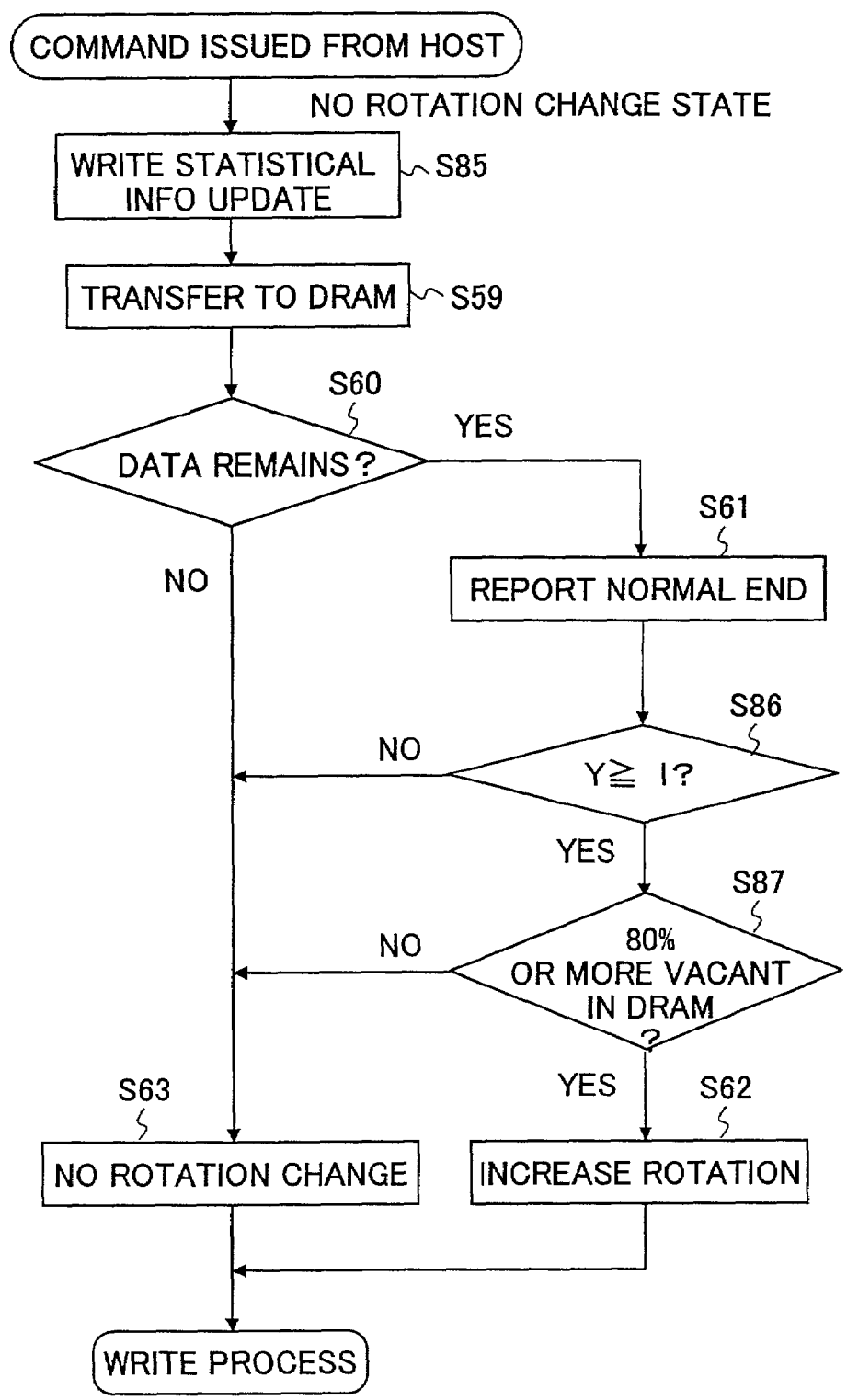
FIG. 27 is a flow chart for explaining the rotational speed control in a fourth embodiment.

D1. Read Command: LBA=1100h/No. of Blocks=20h
D2. Read Command: LBA=1120h/No. of Blocks=20h
D3. Read Command: LBA=1140h/No. of Blocks=20h
D4. Read Command: LBA=1160h/No. of Blocks=20h
D5. Read Command: LBA=1180h/No. of Blocks=20h
D6. Read Command: LBA=11A0h/No. of Blocks=20h
D7. Read Command: LBA=11C0h/No. of Blocks=20h
D8. Read Command: LBA=11E0h/No. of Blocks=20h
D9. Read Command: LBA=1200h/No. of Blocks=20h
D10. Read Command: LBA=1220h/No. of Blocks=20h
D11. Read Command: LBA=1240h/No. of Blocks=20h
D12. Read Command: LBA=1260h/No. of Blocks=20h
D13. Read Command: LBA=1280h/No. of Blocks=20h
. . .
Dn. Read Command: LBA=(1100h+20h×n)/No. of Blocks=20h FIG. 27 is a flow chart for explaining a rotation control based on a state within the DRAM in a fourth embodiment. The process shown in FIG. 27 is carried out by the MPU 12, and is related to the step S11 shown in FIG. 5 which decides whether or not the continuity of the access needs to be judged. In FIG. 27, those steps which are the same as those corresponding steps in FIG. 13 are designated by the same reference numerals, and a description thereof will be omitted. Furthermore, an illustration of those steps carried out when the command is the read command will be omitted in FIG. 21.

Figure 32:
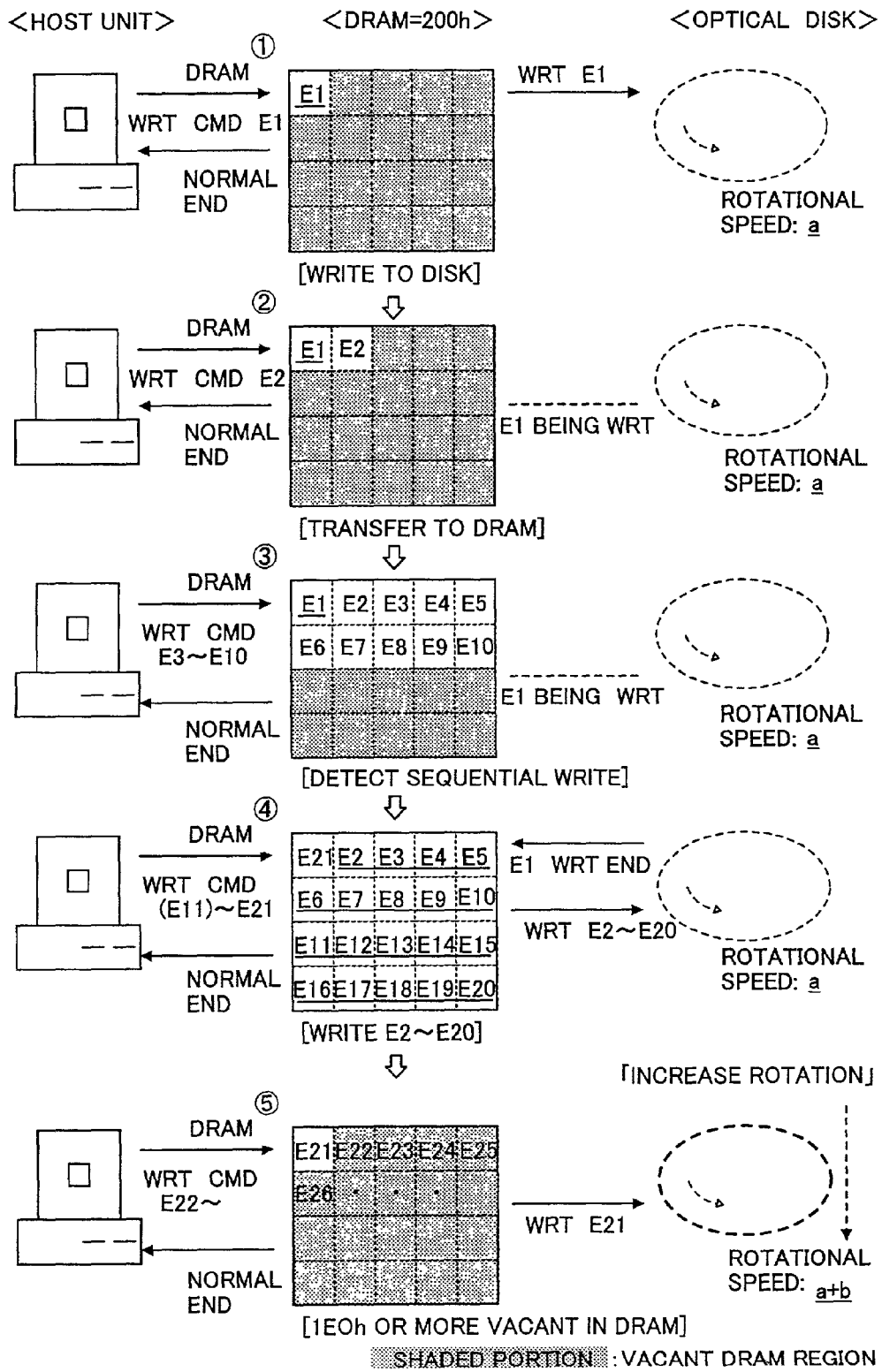
FIG. 32 is a diagram for explaining the rotational speed increasing process and the write data flow in the fourth embodiment.

In this embodiment, a DRAM region is regarded as one section, where one section is made up of 200h blocks, as will be described later in conjunction with FIG. 32. Furthermore, it is assumed that the data transfer rate required by the host unit is 0.4 Mbyte/s. It is also assumed that a time required for the change of the rotational speed of the optical disk 72, that is, a time required for the rotational speed to stabilize after the rotational speed is switched, is 0.5 seconds (s), for example. Moreover, the read hit target data in the DRAM are limited to the sequential data, and the rotational speed is changed when the amount of vacant regions in the DRAM becomes greater than or equal to a predetermined value, similarly as in the case of the first embodiment described above.

In FIG. 27, when the command issued from the host unit is a write command, a step S85 carries out a write statistical information updating process to update a total number Y of sequential blocks which will be described later, and the process advances to the step S59. In addition, after the step S61, a step S86 decides whether or not the total number Y of sequential blocks is greater than or equal to a statistical information reference value 1. The process advances to the step S63 if the decision result in the step S86 is NO, and the process advances to a step S87 if the decision result in the step S86 is YES. The step S87 decides whether or not the vacant regions in the DRAM amount to 80% or more of the total capacity of the DRAM. The process advances to the step S63 if the decision result in the step S87 is NO, and the process advances to the step S62 if the decision result in the step S87 is YES.

In other words, when a write command #E1 with respect to the zone 1 is first issued from the host unit, access pattern information of the LBA and the number of blocks is stored in the DRAM or the SRAM within the memory 18, as the write statistical information. Initially, the write data with respect to the write command #E1 do not exist in the DRAM, and thus, the write data of the write command #E1 are transferred to the DRAM and a normal end of the data transfer is reported to the host unit. In the first embodiment which does not take into-account the sequential access, the rotational speed is changed at this timing. However, in this fourth embodiment, the rotational speed is changed only in the case of the sequential write access, and thus, the rotational speed is not changed in this state.

Then, when a write command #E2 is issued from the host unit, the access pattern information of the LBA and the number of blocks is stored as the write statistical information, similarly as described above. In addition, since the vacant regions in the DRAM amount to 1F0h, the write data of the write command #E2 are transferred to the DRAM, and the normal end of the data transfer is reported to the host unit. Thereafter, when similar processes are carried out with respect to the write commands up to a write command #E10, the write statistical information reaches the reference value 1. Various settings are possible for the reference value 1, but in this case, it is determined that the access is a sequential write access when the write commands are sequential and the total number of processed blocks becomes 100h or greater. In this state, the rotational speed is changed when the vacant regions in the DRAM amount to X % or more of the total capacity of the DRAM, that is, the DRAM region. In this embodiment, when X=80%, the rotational speed is changed when the vacant regions in the DRAM amount to 190h or more, but since the vacant regions only amount to E0h in this state, the rotational speed is not changed. When a write command #E23 is received, vacant regions amounting to 190h or more exist in the DRAM as shown in FIG. 32, and the rotational speed is changed at this timing. FIG. 32 is a diagram for explaining the rotational speed increasing process and the write data flow in this fourth embodiment. In FIG. 32, WRT denotes a write, CMD denotes a command, and a shaded portion denotes a vacant region of the DRAM. In addition, ① through ⑤ respectively indicate the states of the DRAM from the initial state to the state where the vacant regions amounting to 1E0h exist in the DRAM.

Figure 28:
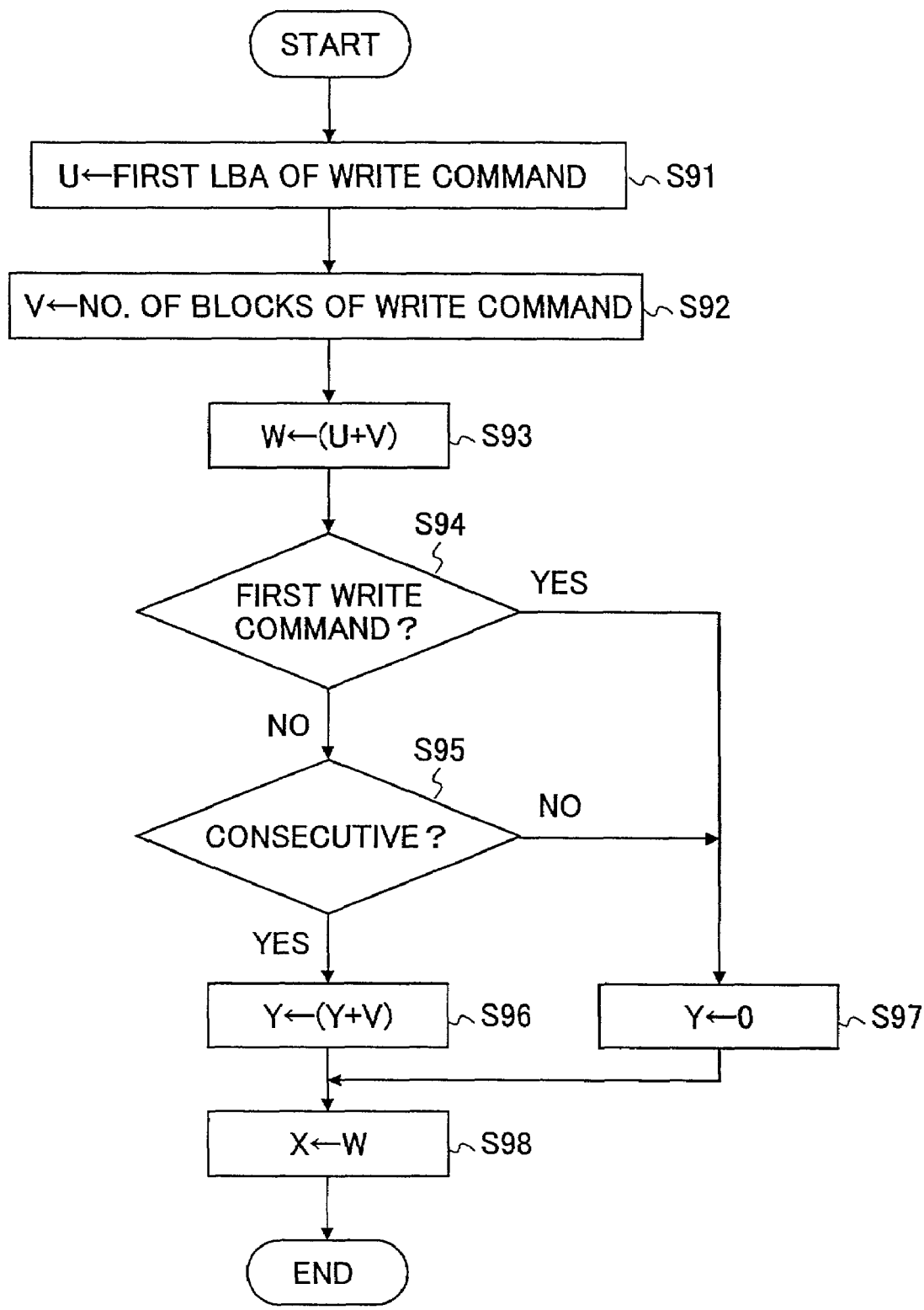
FIG. 28 is a flow chart for explaining a write statistical information updating process.

FIG. 28 is a flow chart for explaining the write statistical information updating process of the step S85 shown in FIG. 27. In FIG. 28, W denotes a last LBA of the write command, X denotes a last LBA of the previous write command, and Y denotes a total number of sequential blocks.

In FIG. 28, a step S91 sets U to a first LBA of the write command, and a step S92 sets V to the number of blocks of the write command. A step S93 sets U+V to W. A step S94 decides whether or not the first write command is received. The process advances to a step S95 if the decision result in the step S94 is NO. The step S95 decides whether or not W and U are consecutive. If the decision result in the step S95 is YES, a step S96 increases the value of Y by setting Y+V to Y. On the other hand, if the decision result in the step S94 is YES or, if the decision result in the step S95 is NO, a step S97 clears the value of Y by setting 0 to Y. After the step S96 or S97, a step S98 updates the value of X by setting W to X, and the process ends.

Figures 29, 30:
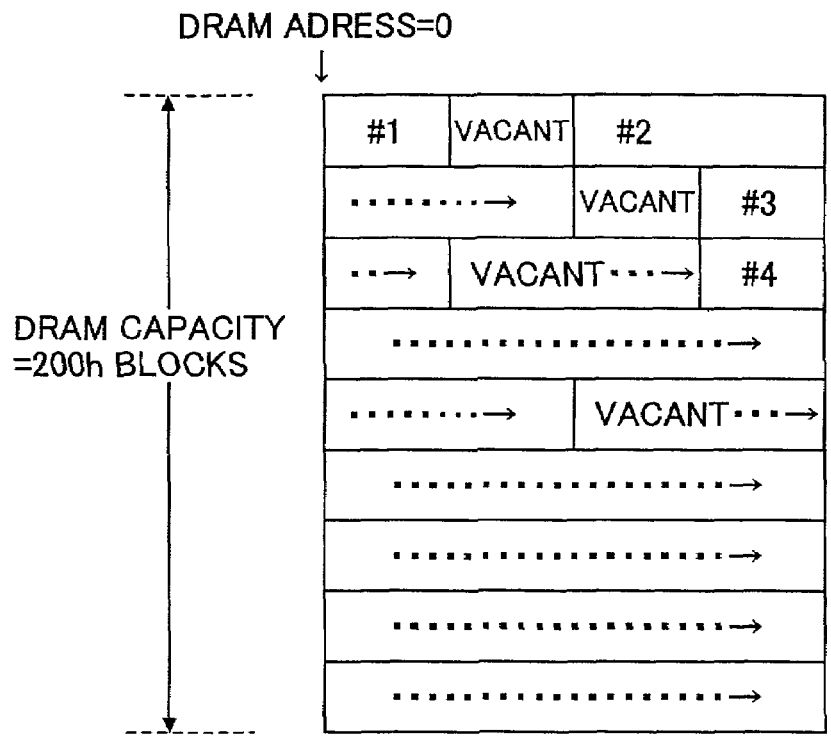
FIG. 29 is a diagram showing write data and vacant regions in the DRAM.
FIG. 30 is a diagram showing a table for managing the write data.

FIG. 29 is a diagram showing the write data and the vacant regions of the DRAM. In addition, FIG. 30 is a diagram showing a table for managing the write data.

Figure 31:
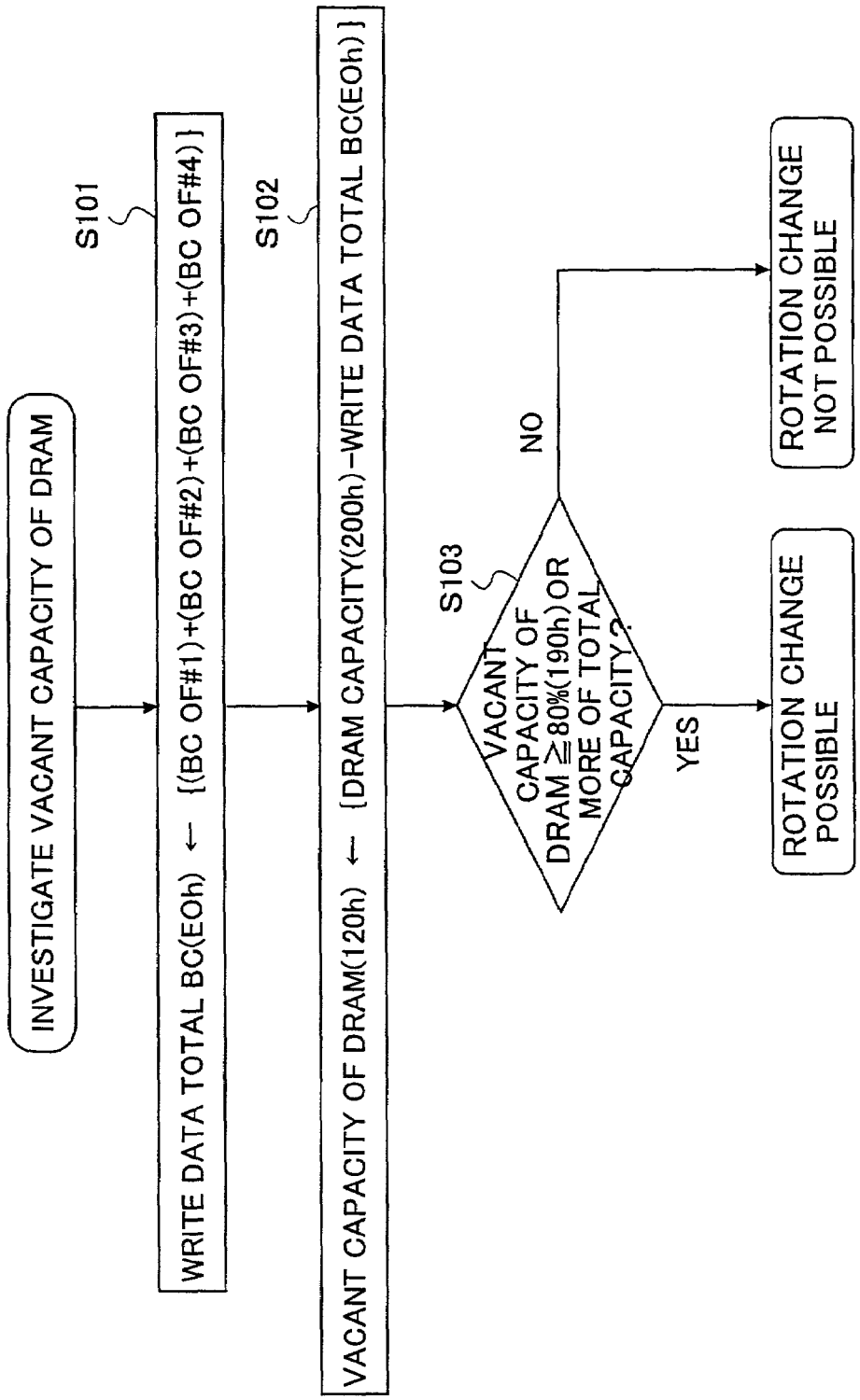
FIG. 31 is a flow chart for explaining a process of investigating a vacant capacity in the DRAM.

FIG. 31 is a flow chart for explaining the process of investigating the amount of vacant regions in the DRAM carried out by the step S87 shown in FIG. 27. In FIG. 31, a step S101 sets the total number of blocks of the write data(BC number E0h of the write data) to a sum of the BC number of the write command #1, the BC number of the write command #2, the BC number of the write command #3, and the BC number of the write command #4, for example. A step S102 sets the amount (120h) of vacant regions in the DRAM to a value which is obtained by subtracting the BC number (E0h) of the write data from the total capacity (200h) of the DRAM, for example. A step S103 decides whether or not the vacant regions in the DRAM amounts to 80% (190h) or more of the total capacity of the DRAM, for example. If the decision result in the step S103 is YES, it is judged that the rotational speed can be changed, and the process advances to the step S62 shown in FIG. 27. On the other hand, if the decision result in the step S103 is NO, it is judged that the rotational speed cannot be changed, and the process advances to the step S63 shown in FIG. 27.

Accordingly, it is possible to obtain the effects of the change of the rotational speed by detecting the sequential write access, during the write process. The change of the rotational speed will not affect the host unit, by changing the rotational speed when the vacant regions in the DRAM amount to X % or more of the total capacity of the DRAM.

For example, the write commands from the host unit include the following.

E1. Write Command: LBA=1100h/No. of Blocks=20h
E2. Write Command: LBA=1120h/No. of Blocks=20h
E3. Write Command: LBA=1140h/No. of Blocks=20h
E4. Write Command: LBA=1160h/No. of Blocks=20h
E5. Write Command: LBA=1180h/No. of Blocks=20h
E6. Write Command: LBA=11A0h/No. of Blocks=20h
E7. Write Command: LBA=11C0h/No. of Blocks=20h
E8. Write Command: LBA=11E0h/No. of Blocks=20h
E9. Write Command: LBA=1200h/No. of Blocks=20h
E10. Write Command: LBA=1220h/No. of Blocks=20h
E11. Write Command: LBA=1240h/No. of Blocks=20h
E12. Write Command: LBA=1260h/No. of Blocks=20h
E13. Write Command: LBA=1280h/No. of Blocks=20h
. . .
En. Write Command: LBA=(1100h+20h×n)/No. of Block=20h When the rotational speed of the optical disk 72 is changed, it takes a predetermined time until the rotational speed stabilizes. Hence, in an embodiment which will be described hereinafter, the switching of the rotational speed is suppressed to a minimum, so as to further improve the data transfer efficiency.

Figure 33:
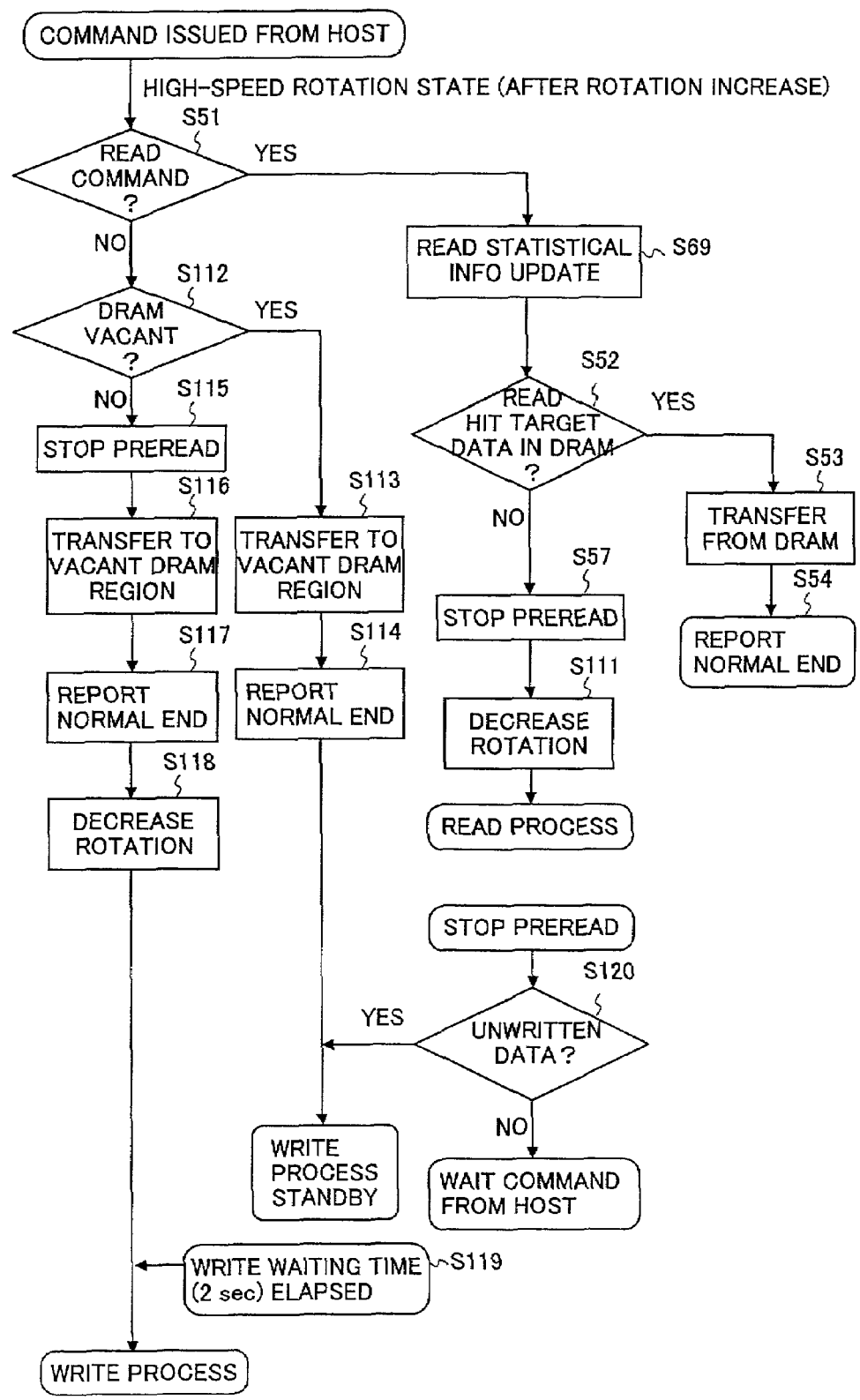
FIG. 33 is a flow chart for explaining the rotational speed control in a fifth embodiment.

FIG. 33 is a flow chart for explaining the rotational speed control based on a state within the DRAM in a fifth embodiment. The process shown in FIG. 33 is carried out by the MPU 12, and is related to the step S11 shown in FIG. 5 which decides whether or not the continuity of the access needs to be judged. In FIG. 33, those steps which are the same as those corresponding steps in FIGS. 13 and 21 are designated by the same reference numerals, and a description thereof will be omitted.

Figure 34:
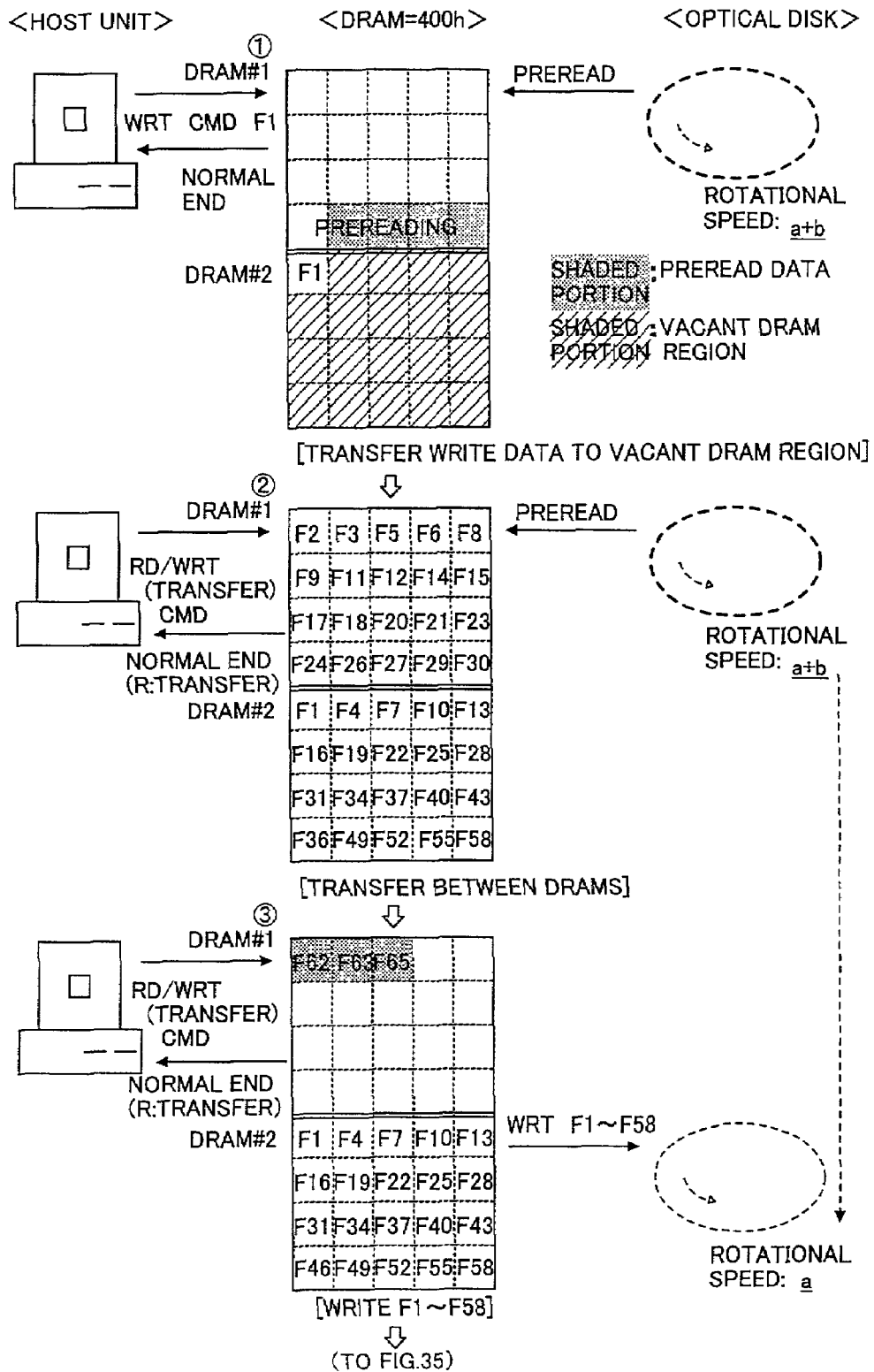
FIG. 34 is a diagram for explaining a continuation of high-speed rotation after the rotational speed increasing process in the fifth embodiment.
Figure 35:
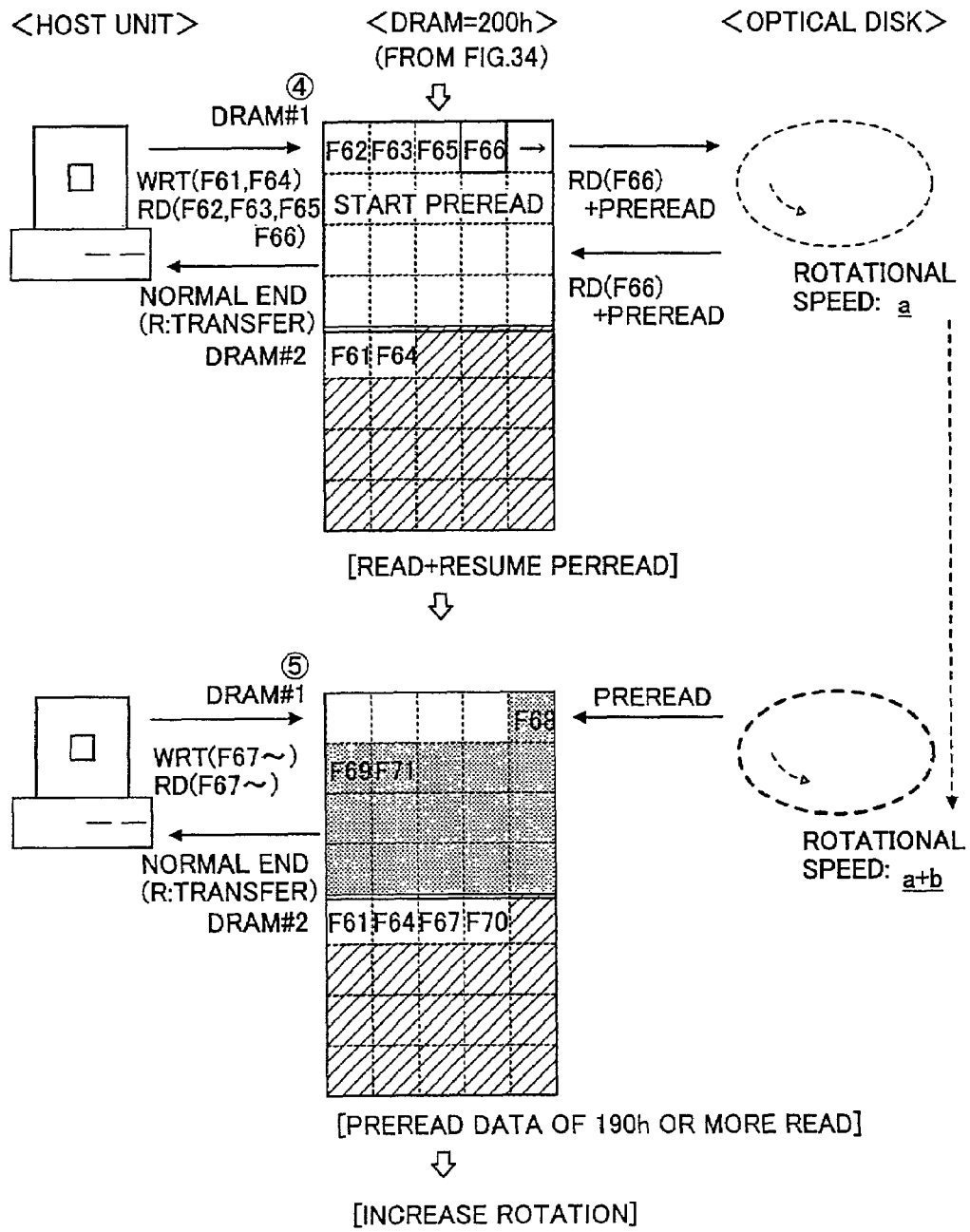
FIG. 35 is a diagram for explaining the continuation of high-speed rotation after the rotational speed increasing process in the fifth embodiment.

In this embodiment, the DRAM region amounting to 400h is sectioned into two sections, where each section is made up of 200h blocks, as shown in FIGS. 34 and 35. Further, in this embodiment, the high-speed rotation state is continued after the rotational speed is increased by one of the first through third embodiments described above. In the first through third embodiments, only one DRAM is used, but in this embodiment, one DRAM is used by dividing the DRAM region into two regions DRAM#1 and DRAM#2 or, two DRAMs, one having the region DRAM#1 and the other having the region DRAM#2, are used.

FIGS. 34 and 35 are diagrams for explaining the continuation of the high-speed rotation after the rotational speed increasing process in the fifth embodiment. In FIGS. 34 and 35, RD denotes a read, WRT denotes a write, CMD denotes a command, a shaded portion denotes an preread data in the DRAM, and a hatching portion denotes an vacant region in the DRAM. Furthermore, ① through ⑤ respectively indicate the states of the DRAM from the initial state where the write data are transferred to the vacant regions of the DRAM to the state where the preread data amounting to 190h or more are read into the DRAM.

In FIG. 33, after the step S57, a step S111 decreases the rotational speed, and the process advances to the read process. On the other hand, if the decision result in the step S51 is NO, a step S112 decides whether or not a vacant region exists in the DRAM. If the decision result in the step S112 is YES, a step S113 transfers the write data from the host unit to the vacant region of the DRAM. In addition, a step S114 reports a normal end of the data transfer to the host unit, and the write process assumes a standby state.

If the decision result in the step S112 is NO, a step S115 stops the preread, and a step S116 transfers the write data from the host unit to the vacant region of the DRAM. In addition, a step S117 reports a normal end of the data transfer to the host unit. A step S118 decreases the rotational speed, and the process advances to the write process.

When the preread is stopped, a step S120 decides whether or not unwritten data exist. If the decision result in the step S120 is NO, the write process assumes a command wait state which waits for a command from the host unit. On the other hand, if the decision result in the step S120 is YES, the write process assumes a standby state.

When the write process assumes the standby state and a waiting time of two seconds, for example, elapses in a step S119, the process advances to the write process.

In other words, after the rotational speed is increased according to the third embodiment, for example, the vacant regions of the DRAM are confirmed when a write command #F1 with respect to the zone 0 is issued form the host unit. Since the preread is being made with respect to the zone 1 at the high-speed rotation using the region DRAM#1, the write data are transferred to the region DRAM#2. After the data transfer, the normal end of the data transfer is reported to the host unit, but the write process is not carried out immediately, and the preread of the region DRAM#1 is continued.

Next, when a read command #F2 is issued from the host unit, the read statistical information is updated, and a confirmation is thereafter made to determine whether or not the read data exist in the DRAM. In this case, the read data amounting to 40h blocks are already read into the region DRAM#1 by the preread, and thus, the read data are transferred from the region DRAM#1 to the host unit.

Thereafter, when similar processes are carried out with respect to the received commands up to a write command #F61, no more vacant regions exist in the DRAM. Hence, the preread is stopped, the rotational speed is switched to that for the zone 0, and the write data of the region DRAM#2 are written on the optical disk 72.

When the writing of the write data in the region DRAM#2 onto the optical disk 72 ends, a vacant region is formed in the region DRAM#2, and the write data of the write command #F61 are transferred to the region DRAM#2. After the write data of the write command #F61 are transferred, the normal end of the data transfer is reported to the host unit, but the write process is not carried out immediately, and a command from the host unit is waited for m seconds. In this embodiment, m=2. Accordingly, if a read command #F62 is issued from the host unit within two seconds, the read statistical information is updated since the read data exist in the region DRAM#1, and then the read data are transferred from the region DRAM#1 to the host unit.

Thereafter, similar processes are carried out with respect to the received commands up to a read command #F65, and since no read data of a read command #F66 exist in the DRAM, the data are read from the optical disk 72 with respect to the read command #F66. Then, the preread of the data following the read command #F66 is carried out. When similar processes are carried out with respect to the commands following the read command #F66, the read hit target data in the region DRAM#1 amounts to 120h or more, and since a sequential access is being made, the rotational speed is changed again similarly as in the case of the third embodiment described above.

When processes similar to the above are carried out thereafter and no command is received from the host unit within two seconds, the write data in the DRAM are written on the optical disk 72. When the rotational speed is increased in response to the read command and a command with respect to a zone, other than the present zone, and in which the rotational speed is to be decreased in particular is received subsequently, the actual operation with respect to the subsequent command is processed later as much as possible, so as to continue the rotation at the increased rotational speed. As a result, it is possible to prevent the random access performance and the data transfer rate from deteriorating due to the change in the rotational speed, and the data transfer efficiency can further be improved.

For example, the commands from the host unit include the following.

Figure 36:
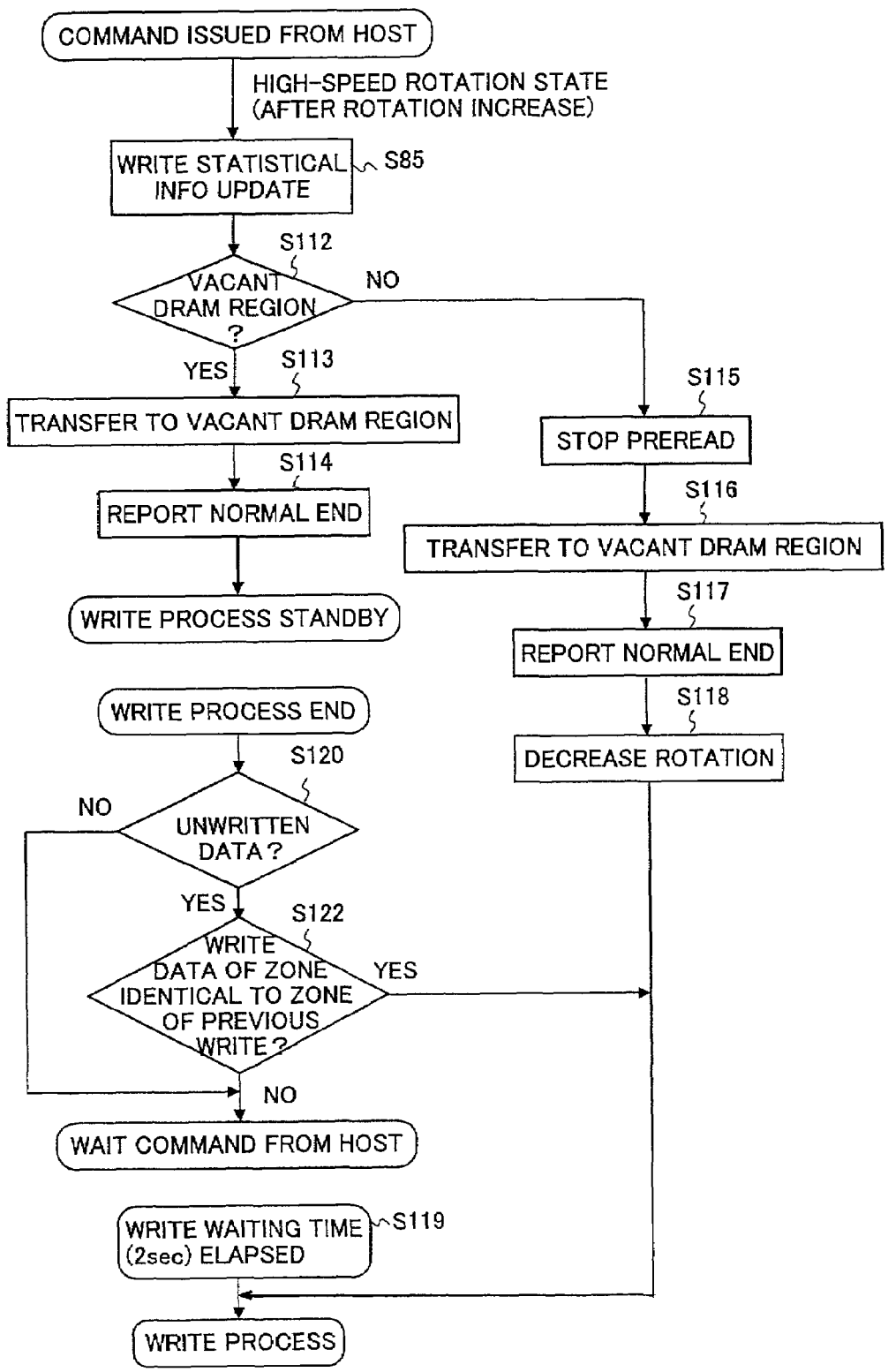
FIG. 36 is a flow chart for explaining the rotational speed control of a sixth embodiment.

F1. Write Command: LBA=100h/No. of Blocks=20h
F2. Read Command: LBA=1120h/No. of Blocks=20h
F3. Read Command: LBA=1140h/No. of Blocks=20h
F4. Write Command: LBA=120h/No. of Blocks=20h
F5. Read Command: LBA=1160h/No. of Blocks=20h
F6. Read Command: LBA=1180h/No. of Blocks=20h
F7. Write Command: LBA=140h/No. of Blocks=20h
F8. Read Command: LBA=11A0h/No. of Blocks=20h
F9. Read Command: LBA=11C0h/No. of Blocks=20h
. . .
Fn. Write Command: LBA=(100h+20×nh)/No. of Blocks=20h
. . .
Fm. Read Command: LBA=(1120h+20×mh)/No. of Blocks=20h #Fm+I. Read Command: LBA=(1120h+40×nh)/No. of Blocks=20h FIG. 36 is a flow chart for explaining the rotational speed control based on a state within the DRAM in a sixth embodiment. The process shown in FIG. 36 is carried out by the MPU 12, and is related to the step S11 shown in FIG. 5 which decides whether or not the continuity of the access needs to be judged. In FIG. 36, those steps which are the same as those corresponding steps in FIGS. 27 and 33 are designated by the same reference numerals, and a description thereof will be omitted.

Figure 37:
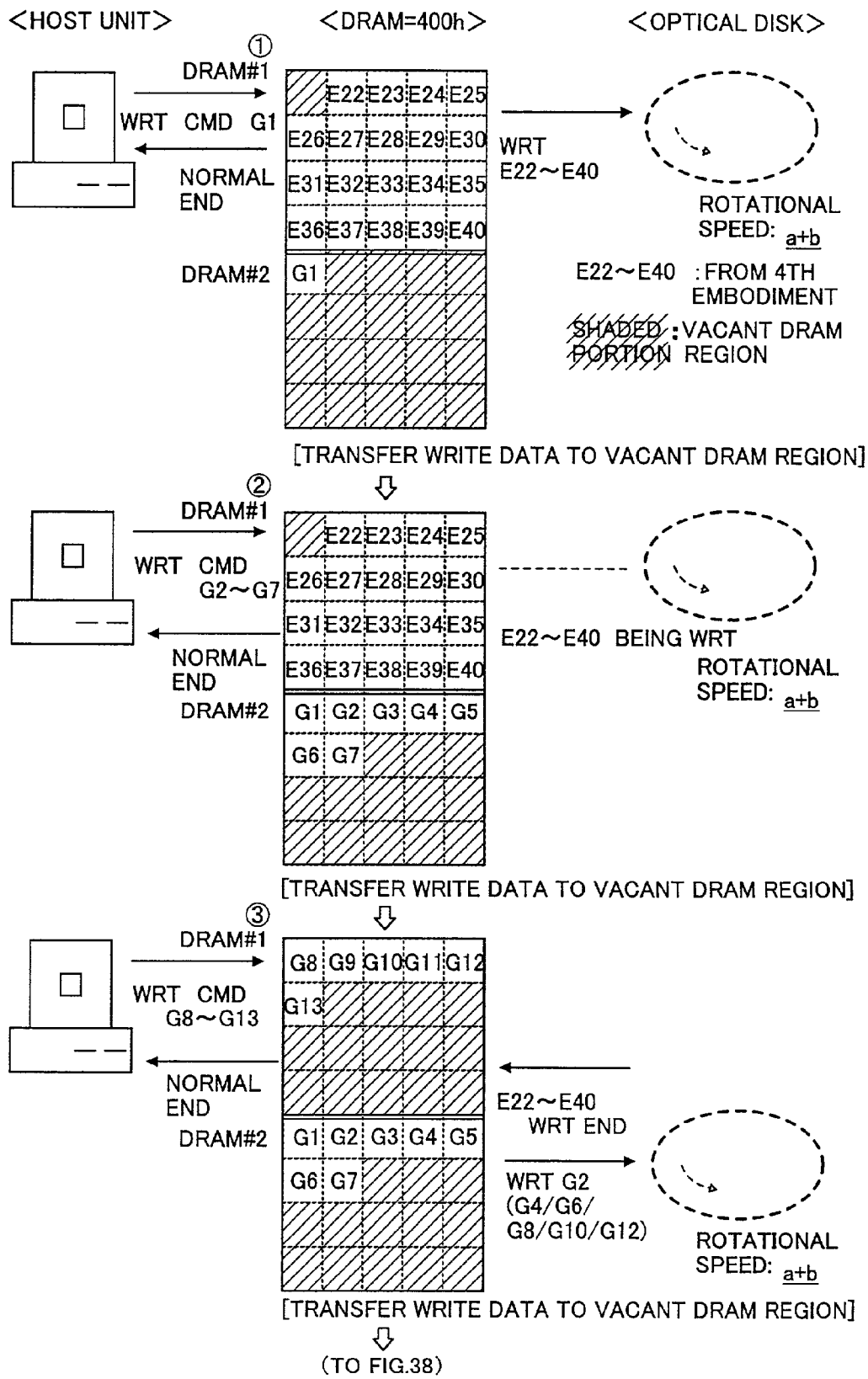
FIG. 37 is a diagram for explaining the continuation of high-speed rotation after the rotational speed increasing process in the sixth embodiment.
Figure 38:
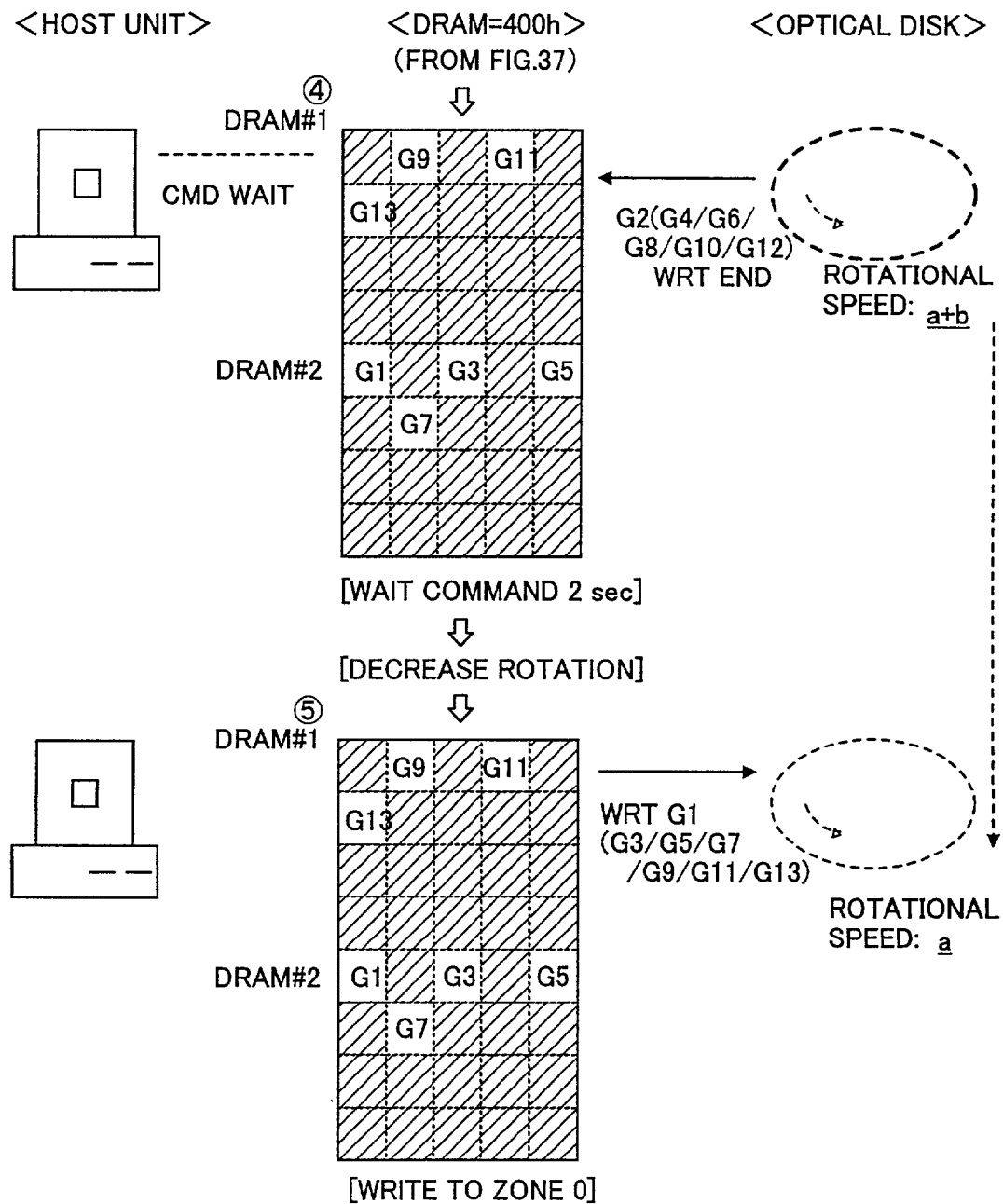
FIG. 38 is a diagram for explaining the continuation of high-speed rotation after the rotational speed increasing process in the sixth embodiment.

In this embodiment, the DRAM region amounting to 400h is sectioned into two sections, where each section is made up of 200h blocks, as shown in FIGS. 37 and 38. Further, in this embodiment, the high-speed rotation state is continued after the rotational speed is increased by the first or fourth embodiment described above. In the first and fourth embodiments, only one DRAM is used, but in this embodiment, one DRAM is used by dividing the DRAM region into two regions DRAM#1 and DRAM#2 or, two DRAMs, one having the region DRAM#1 and the other having the region DRAM#2, are used.

FIGS. 37 and 38 are diagrams for explaining the continuation of the high-speed rotation after the rotational speed increasing process in the sixth embodiment. In FIGS. 37 and 38, WRT denotes a write, CMD denotes a command, and a hatching portion denotes an vacant region in the DRAM. Furthermore, ① through ⑤ respectively indicate the states of the DRAM from the initial state where the write data are transferred to the vacant regions of the DRAM to the state where the data are written to the zone 0 of the optical disk 72.

In FIG. 36, when a write command is issued from the host unit, the step S85 carries out the write statistical information updating process, and the process advances to the step S112. On the other hand, when the write process ends, a step S120 decides whether or not unwritten data exist, and the write process assumes a command wait state which waits for a command from the host unit if the decision result in the step S120 is NO. If the decision result in the step S120 is YES, a step S122 decides whether or not the write data of the zone identical to the zone of the previous write exist. The write process ends if the decision result in the step S122 is YES. If the decision result in the step S122 is NO, the write process assumes the command wait state which waits for the command from the host unit. When the write process assumes the wait state and a write waiting time of two seconds, for example, elapses in a step S119, the write process ends.

In other words, when a write command #G1 with respect to the zone 0 is issued from the host unit after the rotational speed is increased according to the fourth embodiment, for example, the write statistical information is updated before confirming the vacant regions of the DRAM. Since the write with respect to the zone 1 (LBA=13C0h to 161Fh) is carried out at the high-speed rotation from the region DRAM#1, the write data are transferred to the region DRAM#2. After this data transfer ends, the normal end of the data transfer is reported to the host unit. Then, when a write command #G2 with respect to the zone 1 is issued from the host unit, the write statistical information is updated similarly as described above, the write data are transferred to the vacant region DRAM#2, and the normal end of the data transfer is reported to the host unit. Thereafter, similar processes are carried out with respect to the write commands up to a write command #G7.

When the write from the region DRAM#1 ends, the write with respect to the zone 1 in which the write process can be continued at the high-speed rotation is carried out with priority for the write command #G2. Next, when a write command #G8 with respect to the zone 0 is issued from the host unit, the write statistical information is updated similarly as described above, the write data are transferred to the region DRAM#1 from which the write is ended, and the normal end of the data transfer is reported to the host unit. Thereafter, similar processes are carried out with respect to the write commands up to a write command #G13.

After the write with respect to the write command #G2 ends, the write of the write data (of the write commands #G4, #G6, #G8, #G10 and #G10) with respect to the zone 1 is continuously carried out with priority, and the high-speed rotation is maintained. When all of the write with respect to the zone 1 ends, the write with respect to the zone 0 is not carried out immediately, but a command from the host unit is waited for a time of m seconds. In this embodiment, m=2, for example. Accordingly, if a write command with respect to the zone 1 is issued from the host unit within two seconds, the write with respect to the zone 1 is continued and carried-out with priority. On the other hand, if a write command with respect to a zone other than the zone 1 is issued from the host unit, the write data are transferred to the vacant regions of the DRAM, the rotational speed is changed after waiting for two seconds similarly as described above, and the write with respect to the zone 0 is carried out thereafter. In addition, when a write command with respect to the zone 1 or other zones is issued from the host unit and the rotational speed can be changed, the rotational speed is increased depending on the write statistical information and the vacancy state of the DRAM region as in the fourth embodiment described above.

Accordingly, when the rotational speed is increased in response to the write command and a command is received with respect to a zone which is other than the present zone and in which the rotational speed is to be decreased, the actual operation with respect to this command is postponed, so as to continue the rotation at the increased rotational speed. As a result, it is possible to prevent the random access performance and the data transfer speed from deteriorating due to the change in the rotational speed, to thereby further improve the data transfer efficiency.

For example, the write commands from the host unit include the following.

G1. Write Command: LBA=100h/No. of Blocks=20h
G2. Write Command: LBA=1700h/No. of Blocks=20h
G3. Write Command: LBA=120h/No. of Blocks=20h
G4. Write Command: LBA=1720h/No. of Blocks=20h
G5. Write Command: LBA=140h/No. of Blocks=20h
G6. Write Command: LBA=1740h/No. of Blocks=20h
G7. Write Command: LBA=160h/No. of Blocks=20h
G8. Write Command: LBA=1760h/No. of Blocks=20h
G9. Write Command: LBA=180h/No. of Blocks=20h
G10. Write Command: LBA=1780h/No. of Blocks=20h
G11. Write Command: LBA=1A0h/No. of Blocks=20h
G12. Write Command: LBA=17A0h/No. of Blocks=20h
G13. Write Command: LBA=1C0h/No. of Blocks=20h
. . .

Figure 39:
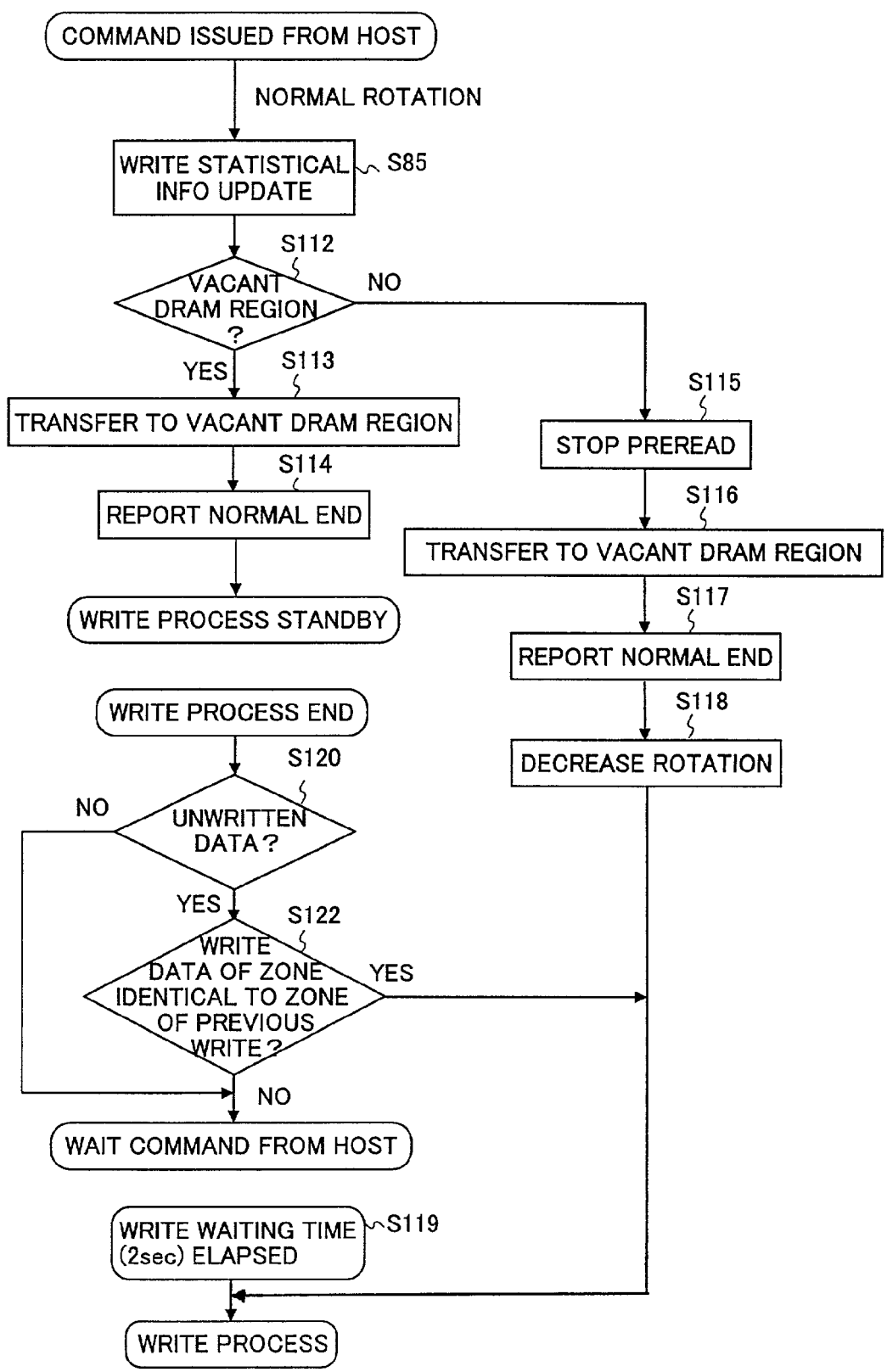
FIG. 39 is a flow chart for explaining the rotational speed control in a seventh embodiment.
Figure 40:
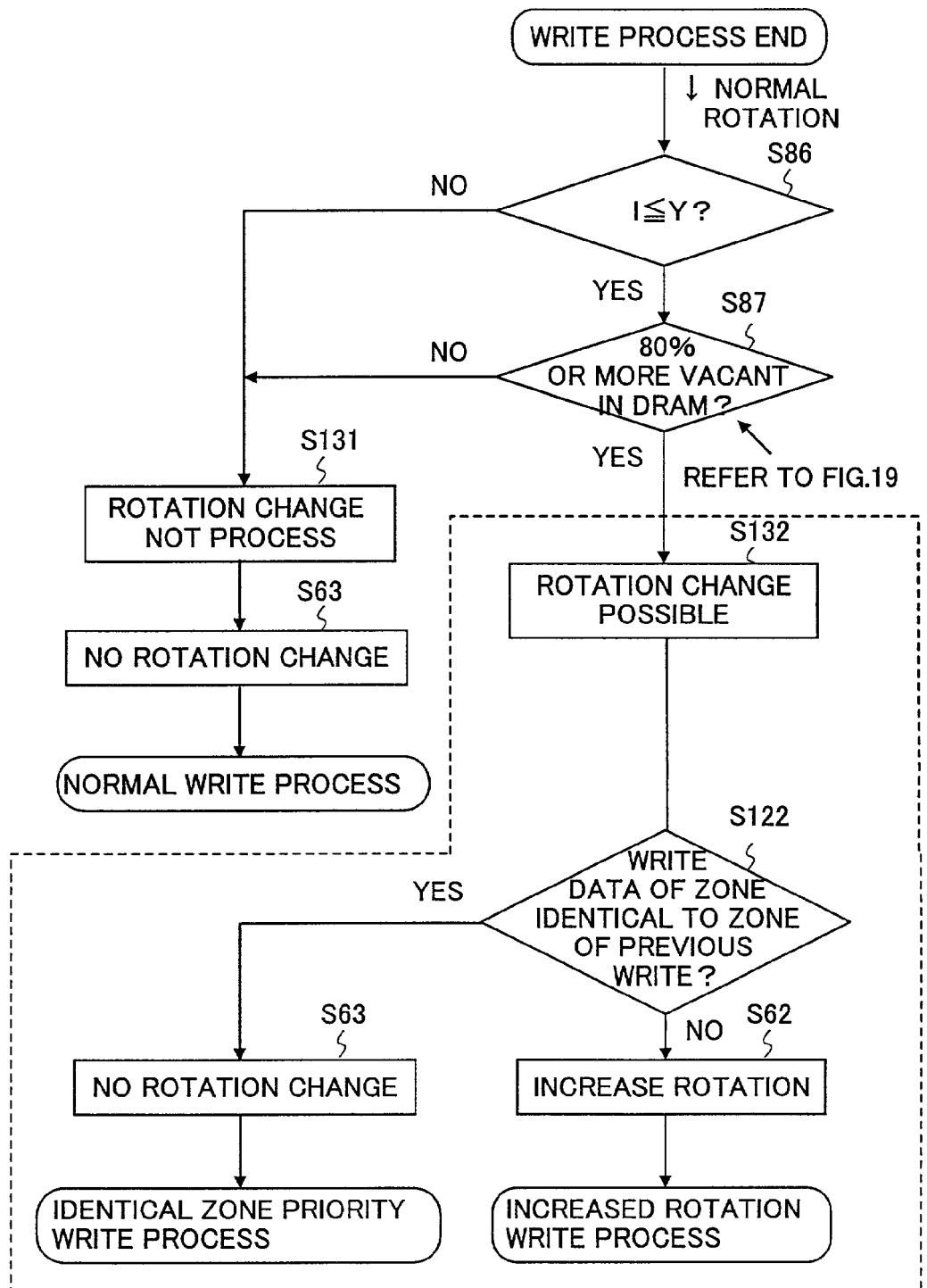
FIG. 40 is a flow chart for explaining the rotational speed control in the seventh embodiment.

FIGS. 39 and 40 are flow charts for explaining the rotational speed control based on a state within the DRAM in a seventh embodiment. The process shown in FIGS. 39 and 40 is carried out by the MPU 12, and is related to the step S11 shown in FIG. 5 which decides whether or not the continuity of the access needs to be judged. In FIGS. 39 and 40, those steps which are the same as those corresponding steps in FIGS. 27 and 36 are designated by the same reference numerals, and a description thereof will be omitted.

In this embodiment, the DRAM region amounting to 400h is sectioned into two sections, where each section is made up of 200h blocks, as shown in FIGS. 37 and 38. Further, in this embodiment, the high-speed rotation state is continued after the rotational speed is increased by the first or fourth embodiment described above. In the first and fourth embodiments, only one DRAM is used, but in this embodiment, one DRAM is used by dividing the DRAM region into two regions DRAM#1 and DRAM#2 or, two DRAMs, one having the region DRAM#1 and the other having the region DRAM#2, are used.

Figure 41:
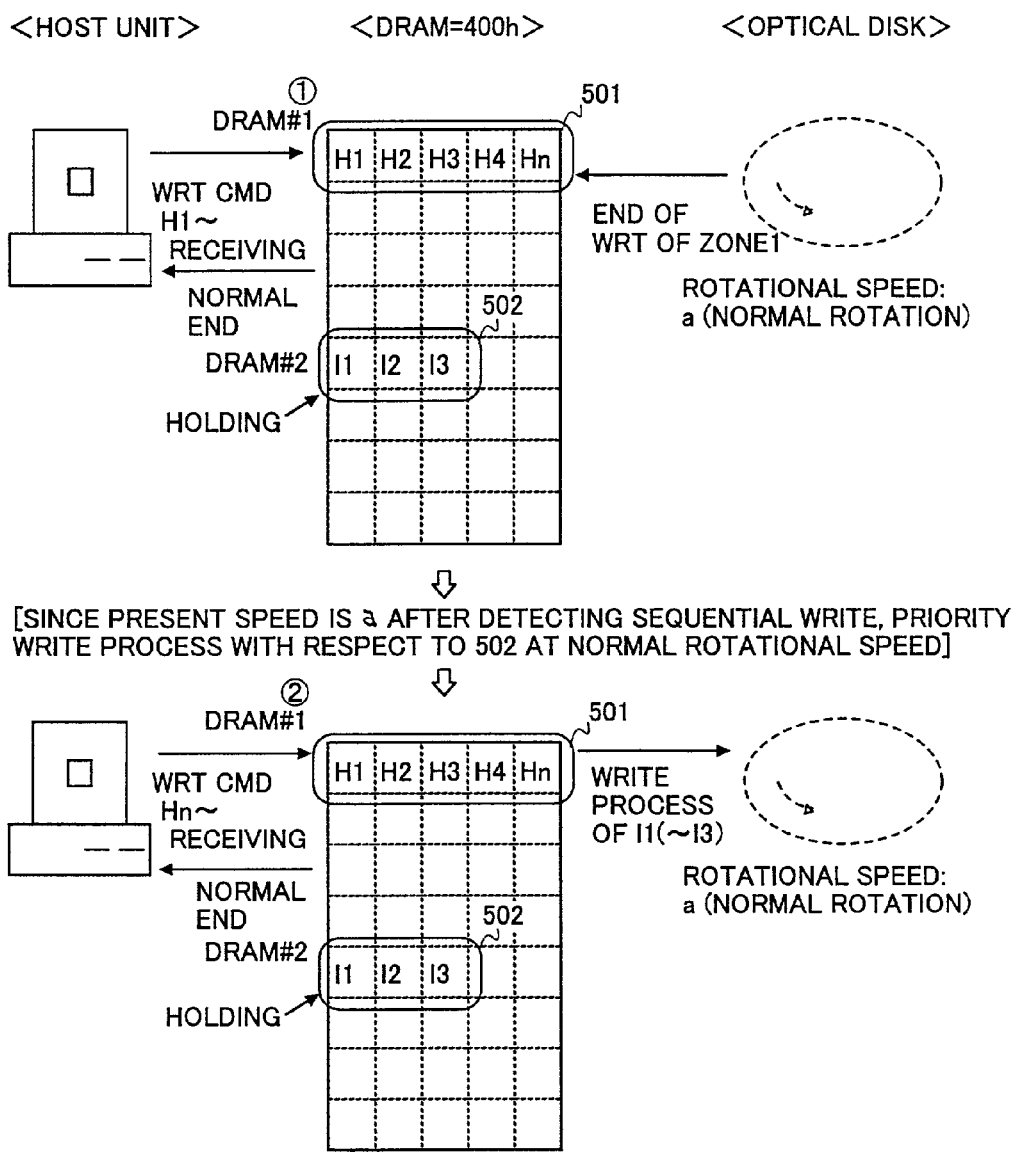
FIG. 41 is a diagram for explaining a priority write process at an existing rotational speed and the rotational speed increasing process in the seventh embodiment.
Figure 42:
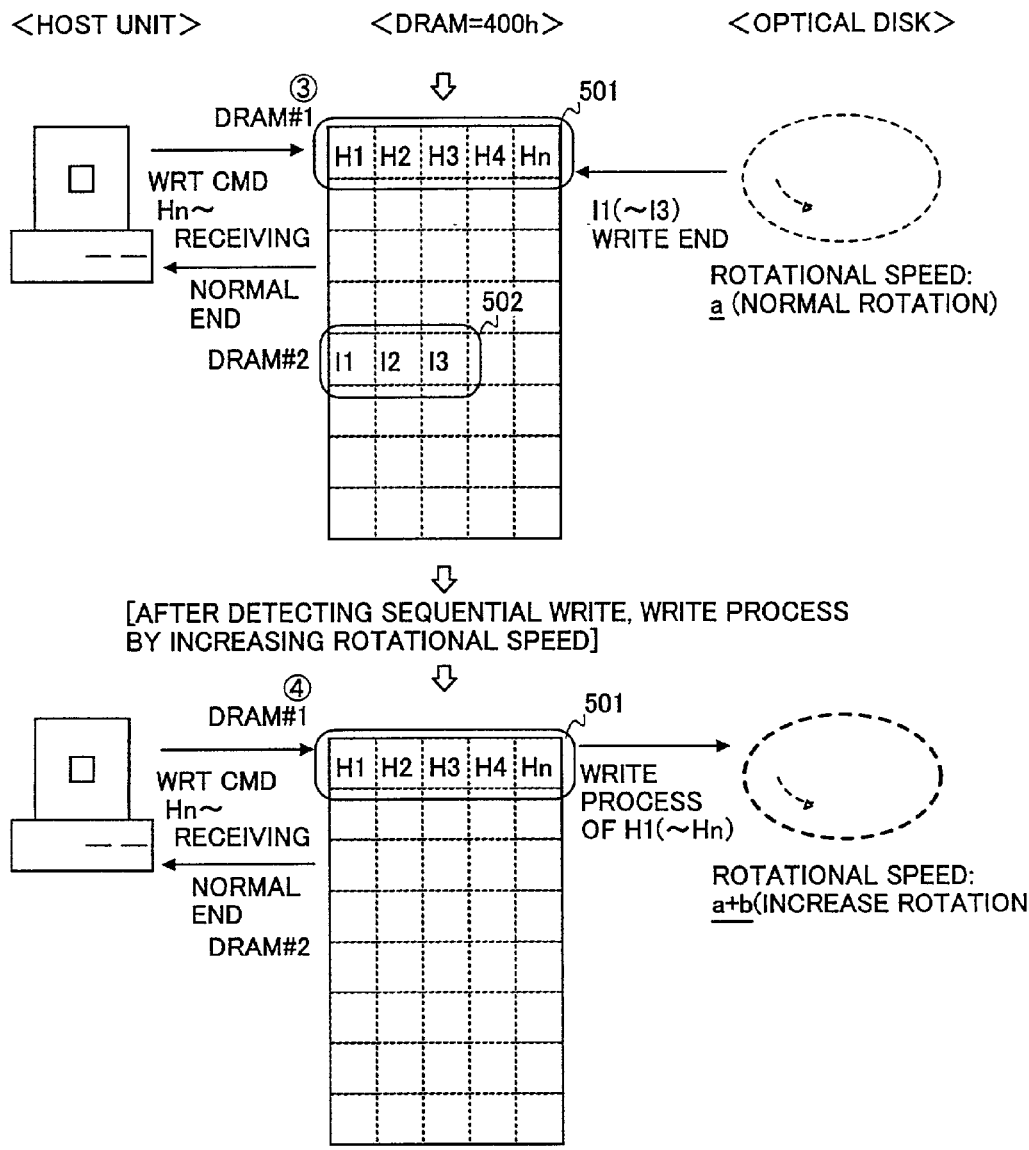
FIG. 42 is a diagram for explaining the priority write process at the existing rotational speed and the rotational speed increasing process in the seventh embodiment.

FIGS. 41 and 42 are diagrams for explaining the continuation of the high-speed rotation after the rotational speed increasing process in the seventh embodiment. In FIGS. 41 and 42, WRT denotes a write, and CMD denotes a command. Furthermore, ① through ④ respectively indicate the states of the DRAM from the initial state where the write data of write commands #H1, . . . are received from the host unit while holding the write data of write commands #I1 through #I3 in the DRAM, to the state where the rotational speed is increased and the write data of the write commands #H1, . . . are written to the optical disk 72. In addition, a reference numeral 501 denotes the write data of the write commands #H1, . . . presently received from the host unit and transferred to the DRAM, and a reference numeral 502 denotes the write data of the write commands #I1 through #I3 already transferred to and held in the DRAM. It is assumed for the sake of convenience that the write data of the write commands #I1 and #I2 are written in the zone 0, the write data of the write command #I3 are written in a zone 2, and the write data of the write commands #H1, . . . are written in a zone 5.

The process shown in FIG. 39 is basically the same as the process shown in FIG. 36, except that the rotational speed of the optical disk 72 is that of the normal mode, which has not been increased, when the write command is issued from the host unit and the step S85 carries out the write statistical information updating process.

In addition, the process shown in FIG. 40 is essentially the same as the process shown in FIG. 27, except that the rotational speed of the optical disk 72 is that of the normal mode, which has not been increased, when the write process ends and the step S86 is carried out. In the case of the process shown in FIG. 40, however, if the decision result in the step S87 is NO, a step S131 judges that the rotational speed cannot be changed, before the process advances to the step S63. Moreover, if the decision result in the step S87 is YES, a step S132 judges that the rotational speed can be changed, before the process advances to the step S122. In addition, the process advances to the step S63 if the decision result in the step S122 is NO, and the process advances to the step S62 if the decision result in the step S122 is YES.

In other words, the write commands from the host unit include the following, for example.

I1. Write Command: LBA=0h/No. of Blocks=20h: Zone 0
I2. Write Command: LBA=20h/No. of Blocks=20h: Zone 0
I3. Write Command: LBA=2000h/No. of Blocks=20h: Zone 2
H1. Write Command: LBA=1100h/No. of Blocks=20h: Zone 5
H2. Write Command: LBA=1120h/No. of Blocks=20h: Zone 5
H3. Write Command: LBA=1140h/No. of Blocks=20h: Zone 5
H4. Write Command: LBA=1160h/No. of Blocks=20h: Zone 5
H5. Write Command: LBA=1180h/No. of Blocks=20h: Zone 5
H6. Write Command: LBA=11A0h/No. of Blocks=20h: Zone 5
H7. Write Command: LBA=11C0h/No. of Blocks=20h: Zone 5
H8. Write Command: LBA=11E0h/No. of Blocks=20h: Zone 5
H9. Write Command: LBA=1200h/No. of Blocks= 20h: Zone 5
H10. Write Command: LBA=1220h/No. of Blocks=20h: Zone 5
H11. Write Command: LBA=1240h/No. of Blocks=20h: Zone 5
H12. Write Command: LBA=1260h/No. of Blocks=20h: Zone 5
H13. Write Command: LBA=1280h/No. of Blocks=20h: Zone 5 . . .
Hn. Write Command: LBA=(1100h+20h×n)/No. of Blocks=20h: Zone 5

In this case, when the conditions for changing the rotational speed are satisfied by the write commands #H1, . . ., the rotational speed is not changed when the DRAM holds the write data for the zones other than the zone in which the rotational speed is to be changed, and the write data for the zones other than the zone in which the rotational speed is to be changed are written to the optical disk 72 with priority at the existing rotational speed. In other words, the write data of the write commands #I1 and #I2 are written in the zone 0, and the write data of the write command #I3 are written in the zone 2. After all of the write data for the zones other than the zone in which the rotational speed is to be changed are written to the optical disk 72, the write data for the zone in which the rotational speed is to be changed are written to the optical disk 72 after increasing the rotational speed. As a result, the write data of the write commands #H1, . . . are written in the zone 5 after increasing the rotational speed.

Therefore, when consecutive write commands are received from the host unit in the fourth embodiment described above, for example, the write with respect to the other zones is carried out with priority at the existing (present) rotational speed, if the write data of the write commands with respect to the other zones are held in the DRAM and the conditions for changing the rotational speed are satisfied by the consecutive write commands. Consequently, it is possible to reduce the number of times the rotational speed is changed, so as to prevent the deterioration of the performance caused by the change of the rotational speed.

In the embodiments described above, the present invention is applied to an optical disk unit which uses a magneto-optical disk. However, the present invention is of course similarly applicable to apparatuses which use disk-shaped recording media such as phase-change type optical disks and magnetic disks. In addition, the shape of the recording medium is not limited to the disk-shape, and the recording medium may have a card-shape or the like with a spiral track or concentric tracks formed similarly to the optical disk of the above described embodiments.

Further, the present invention is not limited to these embodiments, but various variations and modifications may be made without departing from the scope of the present invention.

What is claimed is:

1. A rotation control method for controlling rotation of a CAV system recording medium which has a plurality of zones divided in a radial direction thereof comprising:
    a detecting step which detects a state within a memory which temporarily stores write data to be written on the recording medium and/or read data read from the recording medium; and
    a controlling step which switches and controls a rotational speed of the recording medium based on the state detected by the detecting step, depending on whether an access request is a sequential access request or a random access request and also depending on an area of the recording medium accessed in response to the access request, said area being one of a plurality of areas of the recording medium dividing the recording medium in the radial direction thereof,
    wherein said plurality of areas are independent of the plurality of zones, and include at least a first area in which the rotational speed of the recording medium is capable of being set to a first speed SP1, a second area in which the rotational speed of the recording medium is capable of being set to the first speed SP1 or a second speed SP2, and a third area in which the rotational speed of the recording medium is capable of being set to the first speed SP1, the second speed SP2 or a third speed SP3, where SP1<SP2<SP3.

2. The rotation control method as claimed in claim 1, wherein said controlling step switches the rotational speed when a capacity of the memory occupied by the read data exceeds a first capacity during a read access responsive to the access request, and switches the rotational speed when a vacant capacity of the memory exceeds a second capacity during a write access responsive to the access request.

3. The rotation control method as claimed in claim 2, wherein said controlling step switches the rotational speed by giving priority to an access which uses a rotational speed in use.

4. The rotation control method as claimed in claim 2, wherein said controlling step switches the rotational speed after a predetermined time elapses from a time when conditions for switching the rotational speed are satisfied.

5. The rotation control method as claimed in claim 1, wherein said controlling step switches the rotational speed by giving priority to an access which uses a rotational speed in use.

6. The rotation control method as claimed in claim 3, wherein said controlling step switches the rotational speed after a predetermined time elapses from a time when conditions for switching the rotational speed are satisfied.

7. The rotation control method as claimed in claim 1, wherein said controlling step switches the rotational speed after a predetermined time elapses from a time when conditions for switching the rotational speed are satisfied.

8. The rotation control method as claimed in claim 1, wherein said controlling step switches the rotational speed of the recording medium from an arbitrary speed to a speed that is higher than the arbitrary speed only when the access request is a read request for a hit target read data stored in the memory.

9. The rotation control method as claimed in claim 1, wherein said controlling step switches the rotational speed of the recording medium from an arbitrary speed to a speed that is higher than the arbitrary speed only when a vacant capacity of the memory exceeds a predetermined value.

10. The rotation control method as claimed in claim 1, wherein said controlling step switches the rotational speed of the recording medium from an arbitrary speed to a speed that is higher than the arbitrary speed only when a read hit target data stored in the memory amounts to a predetermined percentage of a total capacity of the memory or greater.

* * * * *